(12) United States Patent
Jena

(10) Patent No.: US 11,108,087 B2
(45) Date of Patent: Aug. 31, 2021

(54) ELECTROLYTES CONTAINING SUPERHALOGENS FOR METAL ION BATTERIES

(71) Applicant: VIRGINIA COMMONWEALTH UNIVERSITY, Richmond, VA (US)

(72) Inventor: Purusottam Jena, Richmond, VA (US)

(73) Assignee: VIRGINIA COMMONWEALTH UNIVERSITY, Richmond, VA (US)

(*) Notice: Subject to any disclaimer, the term of this patent is extended or adjusted under 35 U.S.C. 154(b) by 78 days.

(21) Appl. No.: 16/072,807

(22) PCT Filed: Feb. 7, 2017

(86) PCT No.: PCT/US2017/016828
§ 371 (c)(1),
(2) Date: Jul. 25, 2018

(87) PCT Pub. No.: WO2017/139265
PCT Pub. Date: Aug. 17, 2017

(65) Prior Publication Data
US 2019/0036170 A1    Jan. 31, 2019

Related U.S. Application Data

(60) Provisional application No. 62/292,928, filed on Feb. 9, 2016.

(51) Int. Cl.
*H01M 10/0525* (2010.01)
*H01M 10/054* (2010.01)
(Continued)

(52) U.S. Cl.
CPC ..... *H01M 10/0568* (2013.01); *H01M 10/054* (2013.01); *H01M 10/0525* (2013.01); *H01M 10/0569* (2013.01); *H01M 2300/0034* (2013.01)

(58) Field of Classification Search
CPC .......... H01M 10/0525; H01M 10/054; H01M 10/0568; H01M 10/0569; H01M 2300/0025; H01M 2300/0034; Y02E 60/10
See application file for complete search history.

(56) References Cited

U.S. PATENT DOCUMENTS

| 2011/0150736 A1* | 6/2011 | Hagiwara ............... C07F 5/022 |
| | | 423/276 |
| 2013/0156866 A1 | 6/2013 | Jena |
| 2014/0295292 A1* | 10/2014 | Nakamoto ............ H01M 4/382 |
| | | 429/403 |

OTHER PUBLICATIONS

Giri et al., "Unusual stability of multiply charged oragano-metallic complexes", RSC Advances, vol. 5, May 11, 2015, pp. 44003-44008.

(Continued)

*Primary Examiner* — Brittany L Raymond
(74) *Attorney, Agent, or Firm* — W&C IP

(57) ABSTRACT

Compounds (salts) for use as electrolytes, e.g. in batteries such as Li ion, Na ion and Mg ion batteries are provided. The negative ions (anions) of the compounds are complex molecules containing superhalogens, and thus exhibit improved safety, and yet have electron affinities that are equal to or greater than those of halogens. In addition, the binding energy between Li+ and the anions is relatively small so ions can move easily from one electrode to the other in solutions in which the compounds are dissolved. A further advantage is that the affinity of the electrolyte for water is also relatively low so that batteries in which the electrolytes are used have longer lives than those of the prior art.

11 Claims, 13 Drawing Sheets

(51) Int. Cl.
*H01M 10/0568* (2010.01)
*H01M 10/0569* (2010.01)

(56) References Cited

OTHER PUBLICATIONS

Giri et al. "Superhalogens as Building Blocks of Halogen-Free Electrolytes in Lithium-Ion Batteries", Angewandte Zuschriften, vol. 126, Oct. 14, 2014, pp. 14136-14139.
Jena, P., "Superhalogens: Bridge between Complex Metal Hydrides and Li Ion Batteries," J. Phys. Chem. Lett., vol. 6, Mar. 12, 2015, pp. 1119-1125.
Zhao et al., "Stability of B12(Cn)12^2−: Implications for Lithium and Magnesium Ion Batteries", Angewandte Chemie International Edition, vol. 55, Feb. 16, 2016, pp. 3704-3708.

* cited by examiner

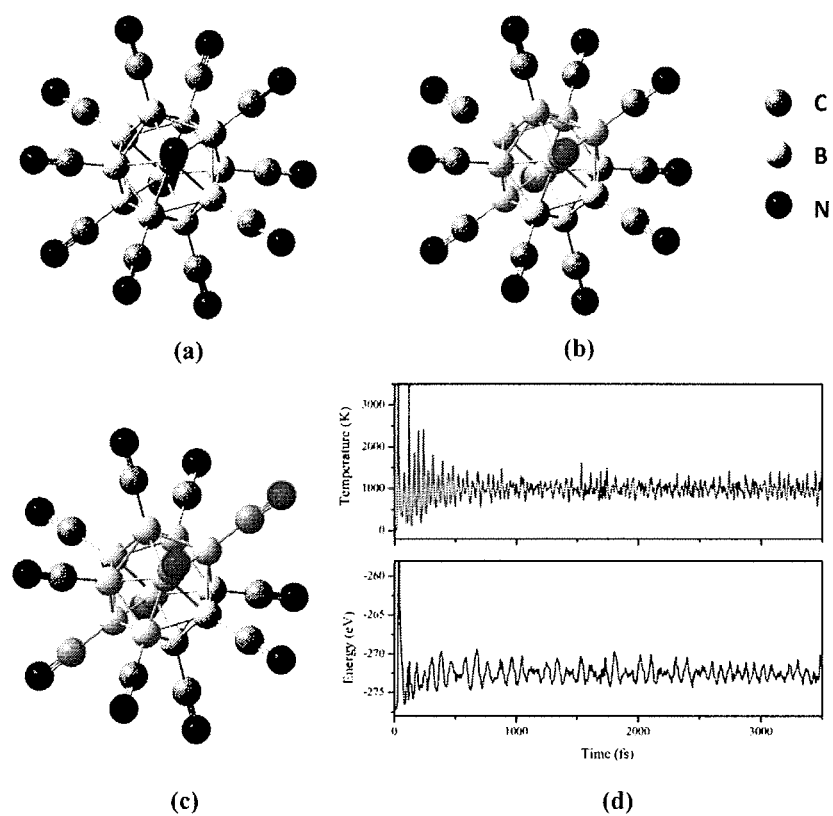
Figure 3A-D

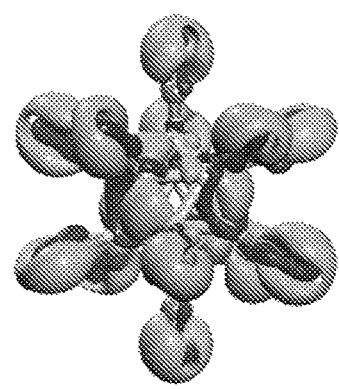 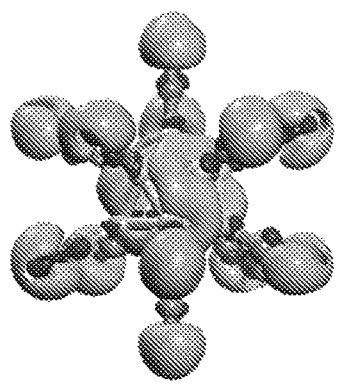 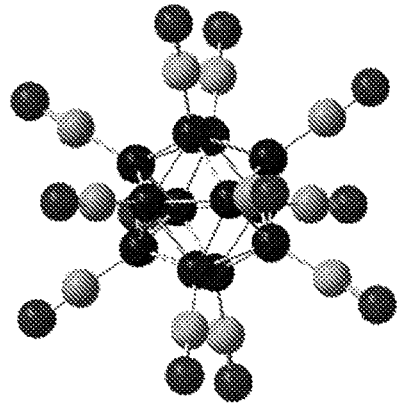
$\rho_{monoanion} - \rho_{neutral}$     $\rho_{dianion} - \rho_{monoanion}$     -0.3 ▬▬▬ 0.2
Figure 4A     Figure 4B     Figure 4C
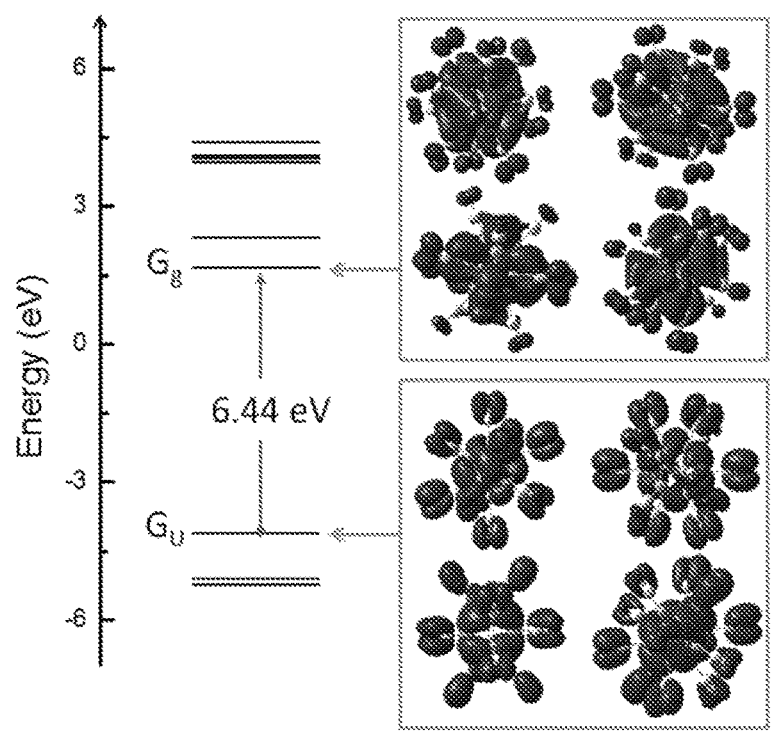
Figure 5

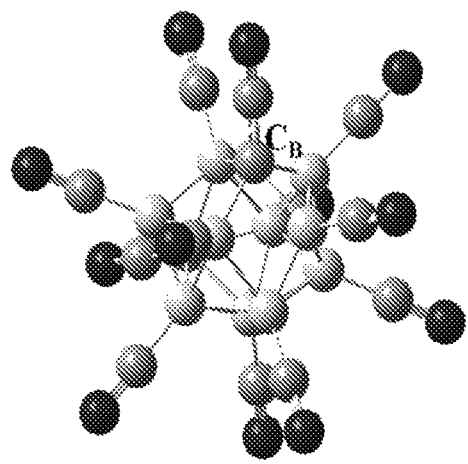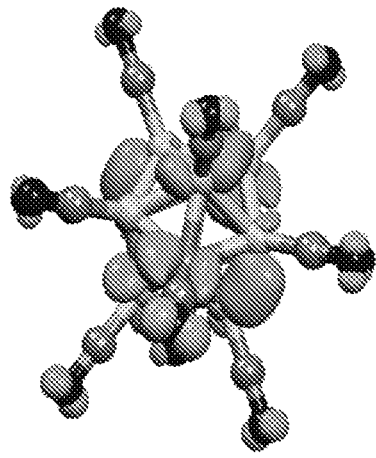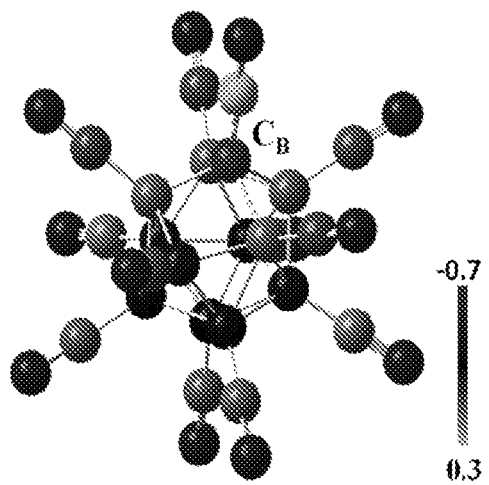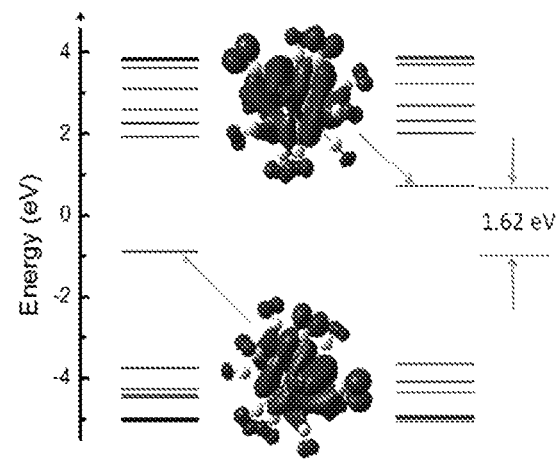
Figure 6A-D

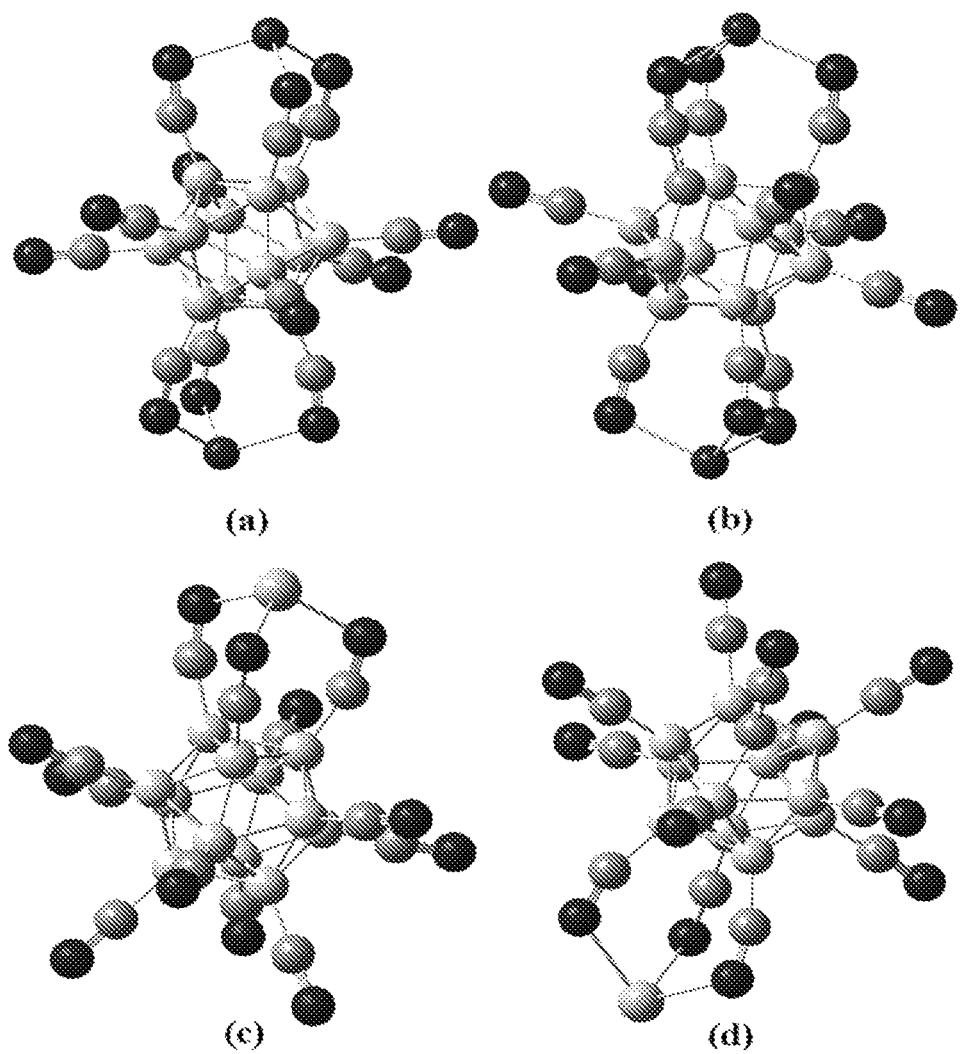
Figure 7A-D

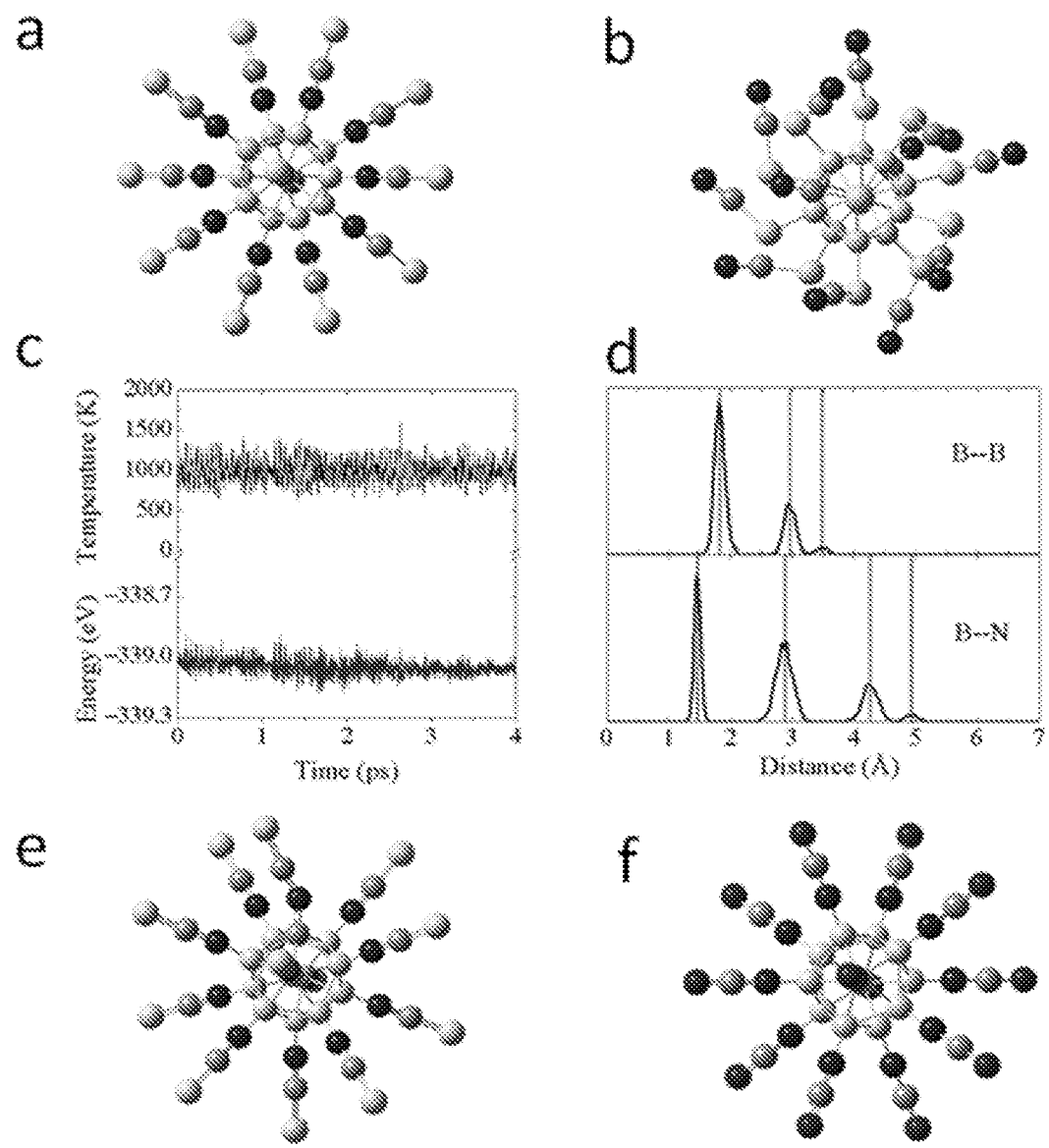
Figure 8A-F

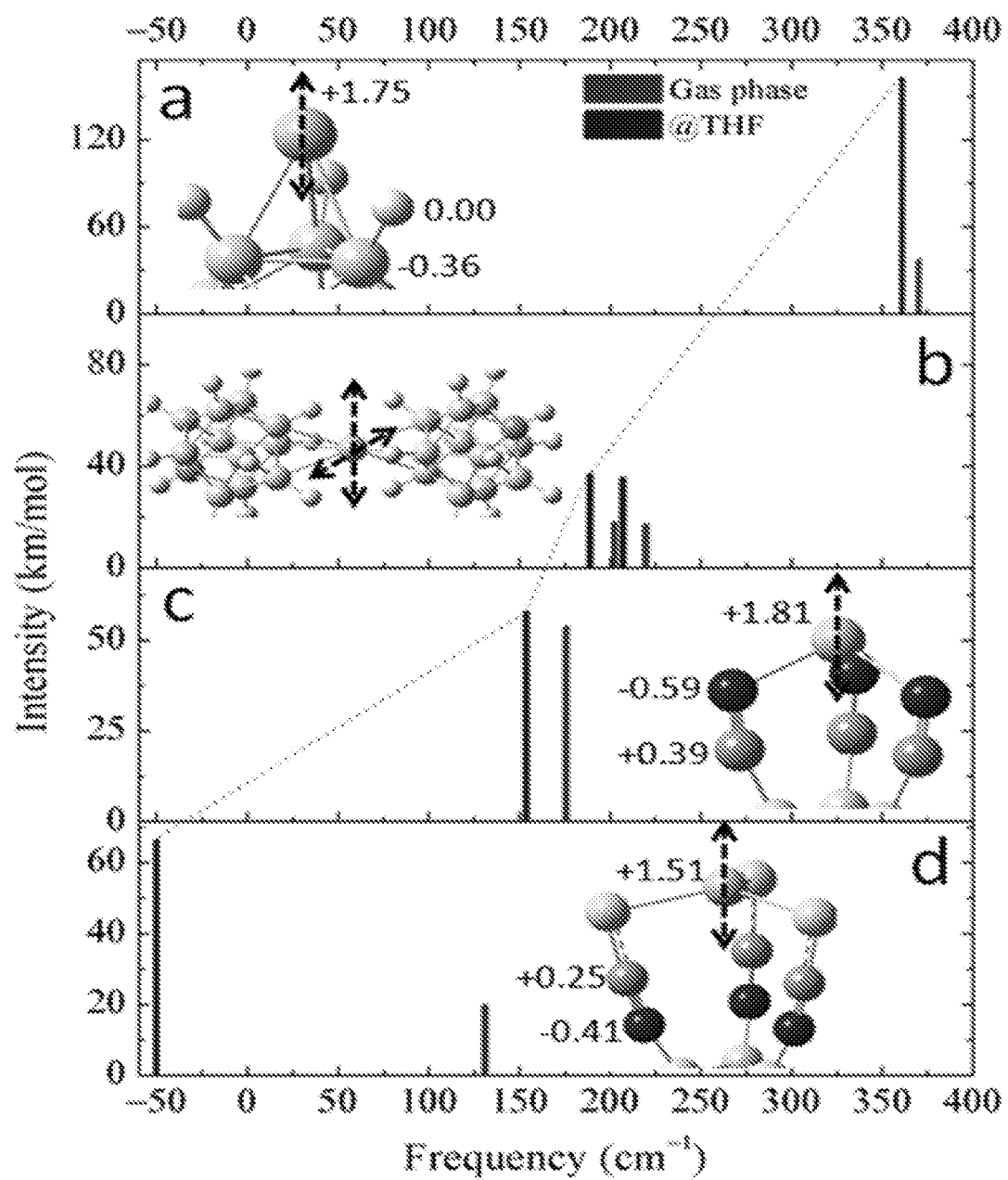
Figure 9A-D

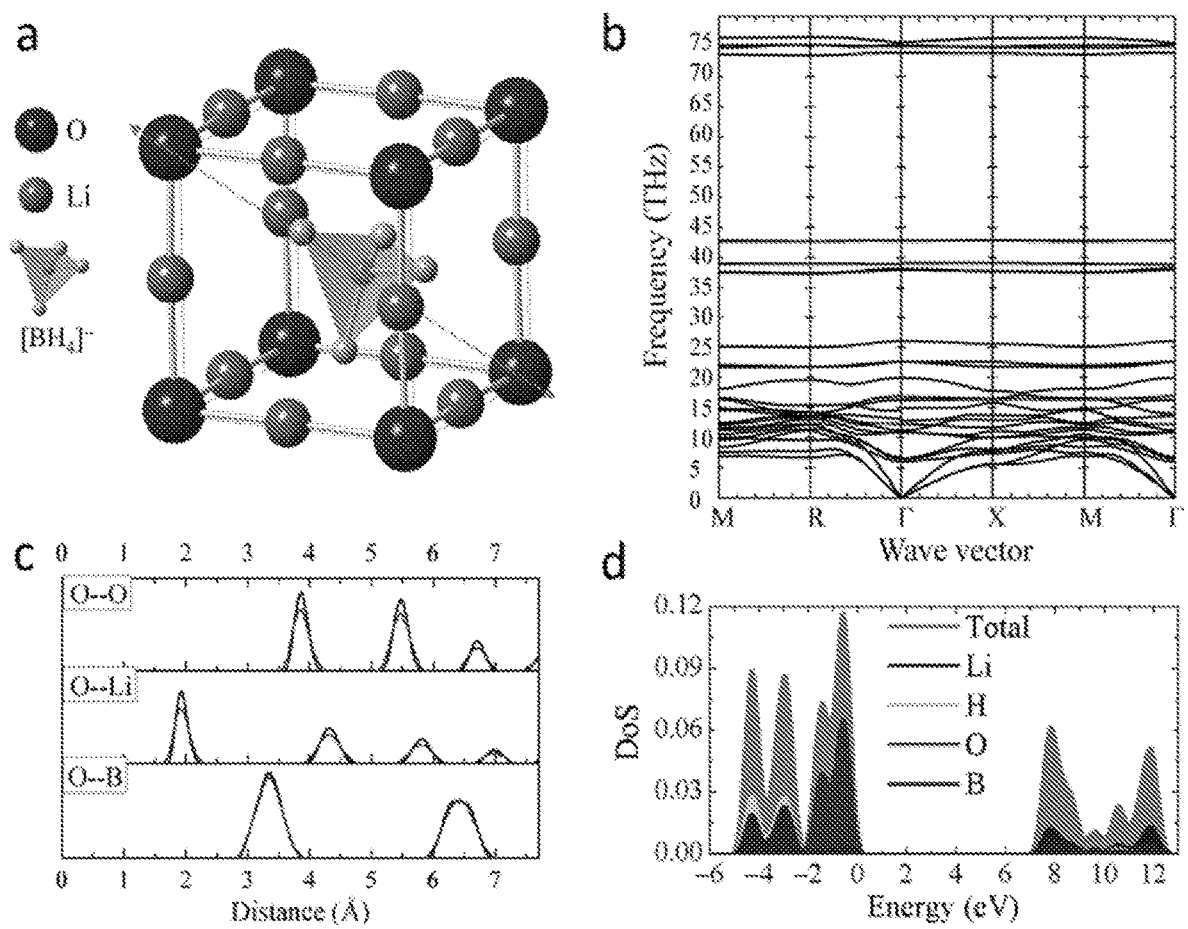
Figure 10A-D

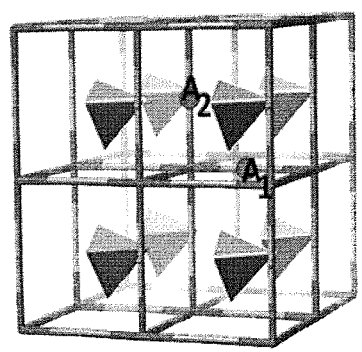
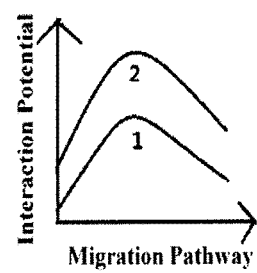
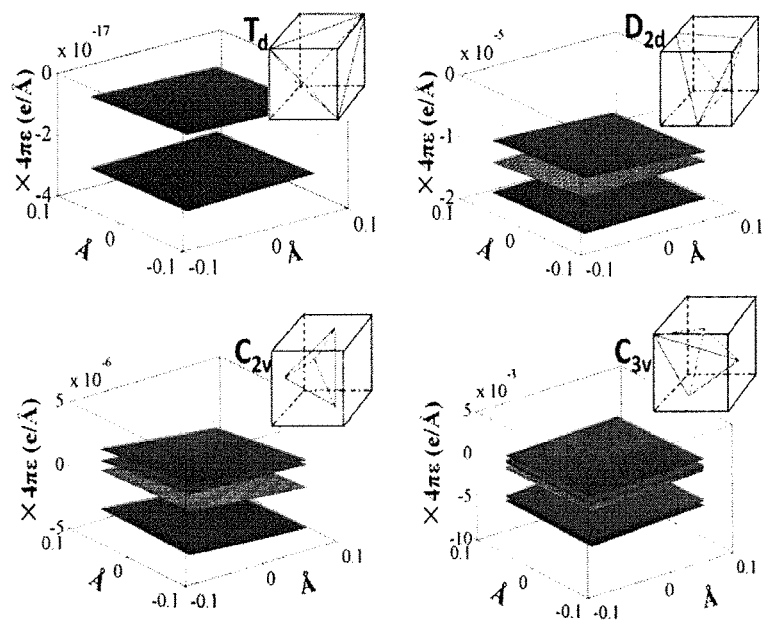
Figure 12A
Figure 12B

ELECTROLYTES CONTAINING SUPERHALOGENS FOR METAL ION BATTERIES

CROSS-REFERENCE TO RELATED APPLICATIONS

This application claims benefit of U.S. provisional patent application 62/292,928, filed Feb. 9, 2016, the complete contents of which is hereby incorporated by reference.

STATEMENT OF FEDERALLY SPONSORED RESEARCH AND DEVELOPMENT

This invention was made with government support under grant number DE-FG02-96ER45579 awarded by the United States Department of Energy. The United States government has certain rights in the invention.

BACKGROUND OF THE INVENTION

Field of the Invention

The invention generally relates to electrolytes containing superhalogens. In particular, the anion portions of the electrolytes are complex molecules having electron affinities that are close to or greater than those of halogens, and the halogen-free electrolytes are suitable for use in batteries (e.g. Li-ion, Na-ion, Mg-ion, etc. batteries) and other applications.

Background

Rechargeable metal-ion batteries have become an indispensable part of our modern life. They not only power portable devices such as cell phones and laptop computers to electric vehicles, but also are essential for a clean energy future. Among the three major components of a battery, namely, the anode, the cathode, and the electrolyte, the latter stands at the center as the supplier of metal ions which shuttle between the electrodes. An electrolyte is composed of metal salt, solvent and chemical additives. The performance of an electrolyte depends on the physical and chemical interactions between these components and that between the components and the electrodes. Any ideal electrolyte should have following characteristics: (1) good electrochemical and thermal stability, (2) high ionic conductivity, and (3) ability to form proper passivation layers on the surface of electrodes while remaining inert in contact with the (intermediate) products produced by the redox of metals during the charging/discharging cycle. In addition, it should be made from less toxic, less expensive, and earth-abundant reagents to reduce the production cost.

As the key component of the electrolyte salt, the anion plays a critical role in realizing these properties. It should be weakly bonded to the metal cation in order that it can have high solubility and conductivity in aprotic solvents. However, all the currently-used electrolyte salts in lithium-ion batteries (LIB) suffer from various drawbacks which greatly limit the battery performance. Although multiply-charged metal-ion batteries, exemplified by the non-dendritic magnesium-ion battery (MIB), enjoy great cost-effective advantage, their prospect is overshadowed by the lack of good candidates for electrolyte salts.

Consequently, a great deal of effort is being made towards the discovery of promising electrolyte salts. However, nearly all of these studies are aimed at developing monoanions for the LIB while those for stable dianions in MIB are rare.

The current electrolytes that are available for use include lithium salts such as $LiAsF_6$, $LiBF_4$, $LiPF_6$, $LiFePO_4$, $LiClO_4$, $LiN(SO_2F)_2$, and $LiN(SO_2CF_3)_2$, combined with organic solvents like ethylene carbonate, dimethyl carbonate, etc. Although these electrolytes are commercially available and popularly used in Li-ion batteries, they have certain disadvantages. With the exception of $LiFePO_4$ the above electrolytes contain halogens which are toxic and corrosive. $LiAsF_6$ is poisonous while $LiClO_4$ is explosive. $BF_4^-$ of $LiBF_4$ creates problem on anode surface, whereas $LiN(SO_2CF_3)_2$ corrodes the cathode. $LiPF_6$ decomposes to $PF_5$ and LiF, the former readily hydrolyzing to form HF and $PF_3O$. These two products are very reactive on both cathode and anode surfaces and impact negatively on electrode performance. Recently it has been shown that $LiFePO_4$ suffers from the same memory effect that has plagued nickel-cadmium and nickel-metal hydride batteries which gradually loose usable capacity if recharged repeatedly after being only partially discharged. Furthermore, Li-ion batteries have limited performance at elevated temperatures and due to the surface phenomena on both electrodes, their life cycle is also limited. The safety features of commercially prepared Li-ion batteries are also insufficient for large size applications. To tackle these problems several attempts have been made by either introducing new solvents or using different salts and additives. However, there is an ongoing need to identify new compounds that are suitable for use as electrolytes, e.g. in Li-ion and other light metal ion (Na and Mg) batteries, but which do not have these undesirable characteristics.

There are three characteristics of electrolytes that need improvement. First, they should be halogen-free to improve safety. Second, since the binding energy between the metal ion and the anionic part of the salt plays an important role in ion conduction, it should be small so that ions can move easily from one electrode to the other. Third, the affinity of the electrolyte to water should also be low so as to increase battery life.

SUMMARY OF THE INVENTION

The present invention provides compounds (salts) for use as electrolytes, e.g. in Li-ion and other metal-ion batteries or other applications. The negative ions of the compounds are complex molecules which contain superhalogens, and thus exhibit improved safety as compared to halogen-containing electrolytes yet they have properties similar or superior to those of current anions in Li-ion battery electrolytes. Their electron affinities are close, comparable or similar to those of halogens (e.g. within about 0.5 eV of Cl), or equal to or greater than those of halogens. In addition, the binding energy between $Li^+$ and the anionic part of the salt is relatively small so $Li^+$ ions can be easily removed from the salt and move easily from one electrode to the other in solutions in which the compounds are dissolved. A further advantage is that the affinity of the electrolyte for water is also relatively low so that Li-ion batteries in which the electrolytes are used have longer lives than those of the prior art. Exemplary compounds which may be used as described herein include $B_{12}(CN)_{12}^{2-}$, $CB_{11}(CN)_{12}^{2-}$, $CB_{11}(CN)_{12}^{-}$, and $O(BH_4)$. Electrically conductive solutions comprising the electrolytes dissolved in a carrier suitable for use in Li-ion batteries are also provided, as are devices which contain the solutions.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

One aspect of the invention provides a battery comprising an electrolyte within a battery housing, wherein negative ions of the electrolyte have the formula $RB_xA_y$, wherein R may be present or absent and if present is a C atom, x and y range from 1-12, and A is CN or SCN. In some embodiments, the battery is a Li ion battery, a Na ion battery or a Mg ion battery. In some embodiments, the electrolyte is selected from the group consisting of $LiCB_{11}(CN)_{12}$, $Li_2CB_{11}(CN)_{12}$, $Li_2B_{12}(CN)_{12}$, $MgB_{12}(CN)_{12}$, $MgCB_{11}(CN)_{12}$, $[LiB_{12}(SCN)_{12}]^-$, $Li_2B_{12}(SCN)_{12}$, $LiCB_{11}(SCN)_{12}$ and $MgB_{12}(SCN)_{12}$. In some embodiments, the battery further comprises a carrier, wherein said electrolyte is dissolved or dispersed in the carrier and wherein the carrier is selected from the group consisting of ethylene carbonate, dimethyl carbonate, allyl methyl sulfone; diethyl carbonate; diethyl sulfite; ethylene sulfite; ethyl methyl carbonate; fluoroethylene carbonate 99%; 3-(methylsulfonyl)-1-propyne; propylene carbonate; 1,2-propyleneglycol sulfite; propylene sulfate; 1,3-propylene sulfite; vinylene carbonate; trans-2,3-butylene carbonate; {2-[2-(2-methoxyethoxy)ethoxy]ethoxy} trimethylsilane; bis {2-[2-(2-methoxyethoxy)ethoxy]ethoxy}dimethylsilane; {3-[2-(2-(2-methoxyethoxy)ethoxy)ethoxy]-propyl}trimethylsilane; and {[2-(2-(2-methoxyethoxy)ethoxy)ethoxy]-methyl} trimethylsilane The invention further provides rechargeable devices or vehicles comprising at least one battery comprising an electrolyte dissolved in a carrier, wherein negative ions of the electrolyte have the formula $RB_xA_y$, wherein R may be present or absent and if present is a C atom, x and y range from 1-12, and A is CN or SCN. In some embodiments, the rechargeable device is a cell phone, a word processing device, a media storage device, a car, or a tool.

The invention also provides solutions comprising i) an electrolyte wherein negative ions of said electrolyte have the formula $RB_xA_y$, wherein R may be present or absent and if present is a C atom, x and y range from 1-12, and A is CN or SCN, and ii) a carrier. In some embodiments, the solution is used as an electrolyte in a battery. The battery may be a Li ion battery, a Na ion battery or a Mg ion battery.

Another aspect of the invention provides a battery comprising an electrolyte within a battery housing, wherein negative ions of said electrolyte have the formula OA and wherein A is a superhalogen. In some embodiments, the negative ions of said electrolyte have the formula $OB_xH_y$, wherein x and y range from 1-12. Embodiments of the invention include rechargeable devices or vehicles comprising the battery as described herein and solutions comprising the electrolytes and carriers described herein.

BRIEF DESCRIPTION OF THE DRAWINGS

FIG. 3A-D. Geometric structure of (a) neutral, (b) mono-anionic, and (c) di-anionic $B_{12}(CN)_{12}$. (d) Total energy and temperature fluctuation with respect to time of AIMD simulation of $B_{12}(CN)_{12}^{2-}$.

FIG. 4A-C. Panels (a) and (b) are electron density in iso-surface mode (0.005 |e|/Å$^3$). Panel (c) is NBO charge distribution of $B_{12}(CN)_{12}^{2-}$.

FIG. 5. Energy diagram and frontier orbitals of $B_{12}(CN)_{12}^{2-}$.

FIG. 6A-D. (a) Geometric structure, (b) spin density, (c) NBO charge distribution and (d) energy diagram and frontier orbitals of $CB_{11}(CN)_{12}^{2-}$.

FIG. 7A-D. Optimized geometries of (a) $Li_2B_{12}(CN)_{12}$, (b) $Li_2CB_{11}(CN_{12}$, (c) $MgB_{12}(CN)_{12}$ and (d) $MgCB_{11}(CN)_{12}$.

FIG. 8A-F. Optimized structures of (a) the ground state of $B_{12}(SCN)_{12}^{2-}$; (b) its isomer $B_{12}(NCS)_{12}^{2-}$; (e) the derivative $CB_{11}(SCN)_{12}^-$ and (f) the ground state of $B_{12}(OCN)_{12}^-$. (c) Temperature and free energy extracted from the molecular dynamics simulation (MDS) of $B_{12}(SCN)_{12}^{2-}$ at 1000 K for 4 ps after the thermal equilibrium is reached. (d) Computed radial distribution function (of B—B and B—N) from the trajectory data of the MDS. The vertical lines indicate the ideal distance of the ground-state geometry.

FIG. 9A-D. The IR mode related to the dissociation of Mg ion from the anion in (a) $MgB_{12}H_{12}$, (b) $Mg(CB_{11}H_{12})_2$, (c) $MgB_{12}(CN)_{12}$ and (d) $MgB_{12}(SCN)_{12}$. The dotted line is to guide the eye. The numbers show the charge states of the atoms from the NBO analysis.

FIG. 10A-D. (a) Unit cell of the optimized ground state of $Li_3O(BH_4)$. The arrow indicates the $C_3$ axis of $BH_4^-$ tetrahedron inside the cubic cell. (b) Calculated phonon spectrum of $Li_3O(BH_4)$ along high-symmetry directions. (c) Radial distribution functions between atom pairs computed from the trajectory data of molecular dynamics simulations at 400 and 600 K. (d) Calculated electronic density of states (DoS) and partial DoS using HSE06 method.

FIG. 12A-F. (a) The model used to study the conduction mechanism of $Li_3O(BH_4)$. $A_1$ and $A_2$ indicate the Li$^+$ sites. Each site is coordinated by four $BH_4^-$ tetrahedra and experiences the potential generated by these $BH_4^-$ units with certain orientational symmetry. Curve 1 and 2 show the possible potential barriers along the migration pathway of Li$^+$ ion according to different orientations of the $BH_4^-$ rotors. (b) The schematic configurations of the $BH_4^-$ tetrahedron inside a cube having $T_d$, $D_{2d}$, $C_{2v}$ and $C_{3v}$ symmetries. With each symmetry group, the potential surfaces (dipole+ quadrupole terms in Eq. (2) and (3)) generated by four $BH_4^-$ rotors in a region of 0.1 Å×0.1 Å square are calculated for all the symmetrically equivalent orientations in the group. (c) Orientations of $BH_4^-$ rotors around the fastest Li$^+$ ion in the simulation. (d) Orientations of $BH_4^-$ rotors that generate the minimum potential. (e) Orientations of $BH_4^-$ rotors that generate the maximum potential. (f) Orientations of $BH_4^-$ rotors that generate zero potential.

DETAILED DESCRIPTION

Figure 1:
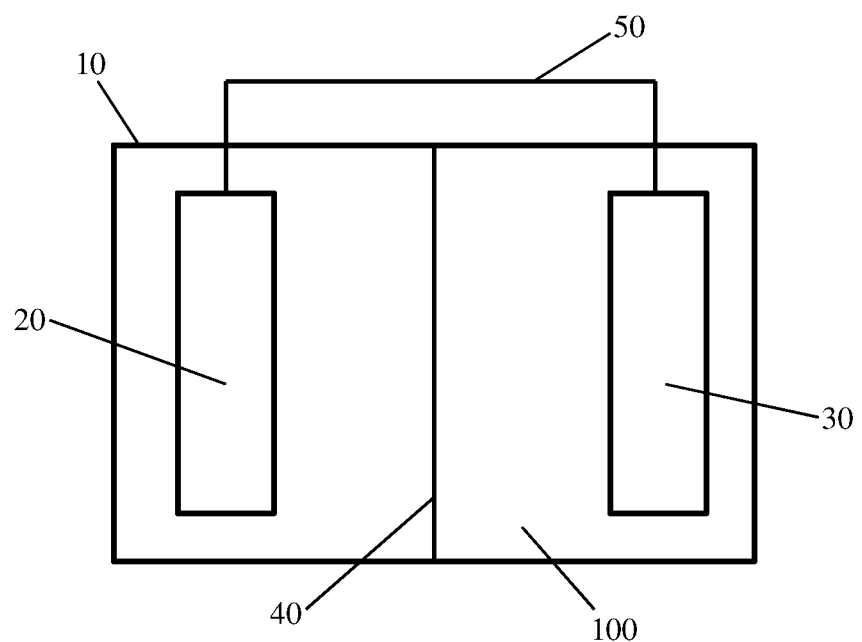
FIG. 1. Schematic representation of a metal ion battery comprising an electrolyte of the invention.

The invention provides negative ions (anions) in compounds (e.g. salts) for use as electrolytes in Li-ion and other metal-ion batteries. The compounds advantageously do not contain halogens (e.g. Cl, Br, etc.) and are thus "environmentally friendly" and safer to use than the halogen-containing compounds of the prior art. The negative ions of the electrolytes provided herein are complex molecules which, even though they do not contain halogens, have electron affinities that are equal to or greater than those of halogens, yet the binding energy between Li⁺ and the anionic part of the salt is relatively small and the affinity for water is also advantageously low. Use of these negative ions in electrolytes can also increase current density while reducing weight.

Exemplary negative ions of the invention include dodecacyanododecaborate [$B_{12}(CN)_{12}^{2-}$] as well as its derivatives where one of the B atoms is replaced by C atom, e.g. [$CB_{11}(CN)_{12}^{2-}$ and $CB_{11}(CN)_{12}^{-}$]. Dodecacyanododecaborate is created by replacing H atoms with CN molecules in dodecaborate [$B_{12}H_{12}^{2-}$]. In some embodiments, SCN (thiocyanate) is used to repace the H atoms in dodecaborate. A similar route of synthesis as that used for the synthesis of $B_{12}X_{12}^{2-}$, X=F, Cl, Br, I can be used. These ions are used as effective components of halogen-free electrolytes in metal (e.g., Li, Na, and Mg) ion batteries. Further embodiments of the invention provide a new class of antiperovskites molecules ($Li_3OA$; A=halogen) where the halogen is replaced with a superhalogen, e.g. [$Li_3O(BH_4)$].

A superhalogen is a halogen-free molecule that when part of a negative ion the vertical electron detachment energies of the moieties that make up the negative ions are equal to or greater than that of any halogen atom (see WO 2016/049309 incorporated herein by reference). Exemplary superhalogens include, but are not limited to, $BH_4$, CN, SCN, $NO_3$, $FePO_4$, $B_3H_8$, $CB_{11}H_{12}$, etc.

An electrolyte is a substance that separates into ions (cations and anions) when dissolved or dispersed in a polar solvent, such as water, forming a solution that conducts an electrical current. Electrolytes act as ion carriers, e.g. between an anode and a cathode when current flows through an external source. As used herein, "electrolyte" may also refer to a solution which contains such a substance dissolved therein.

A lithium-ion battery (Li-ion battery, LIB) is a member of a family of rechargeable (secondary) battery types in which lithium ions move from the negative electrode to the positive electrode during discharge and back when charging. Similarly, in Na-ion and Mg-ion batteries the negative ions of the electrolytes are the same as those in Li-ion batteries.

"Solution" refers to a homogeneous mixture composed of only one phase. In such a mixture, a solute (e.g. an electrolyte) is dissolved or dispersed in a solvent (carrier). Exemplary liquid solvents (carriers) that may be used to dissolve the compounds disclosed herein during use, e.g. in a Li-ion battery, include but are not limited to: ethylene carbonate, dimethyl carbonate, allyl methyl sulfone; diethyl carbonate; diethyl sulfite; ethylene sulfite; ethyl methyl carbonate; fluoroethylene carbonate 99%; 3-(methylsulfonyl)-1-propyne; propylene carbonate; 1,2-propyleneglycol sulfite; propylene sulfate; 1,3-propylene sulfite; vinylene carbonate; trans-2,3-butylene carbonate; silane compounds such as {2-[2-(2-methoxyethoxy)ethoxy]ethoxyl}trimethylsilane, bis{2-[2-(2-methoxyethoxy)ethoxy]ethoxy}dimethylsilane, {3-[2-(2-methoxyethoxy)ethoxy]-propyl}trimethylsilane and {[2-(2-(2-methoxyethoxy)ethoxy]-methyl} trimethylsilane; etc.

As used herein, a "complex molecule" refers to a compound comprising more than one type of element e.g. comprising from about two to about four different types of elements (e.g. about 2, 3, or 4), which are chemically bonded to act as one, i.e. as a single unit. The anionic portions of the electrolytes described herein are complex molecules. Preferred components of the complex molecules include, but are not limited to: B, H, N, O, C and S.

The anions of the electrolytes provided herein have electron affinities that, in some applications, are equal to or greater than those of halogens. For example, as indicated by the vertical detachment energies (VDEs) of the anionic portion of the electrolytes (i.e. the energy needed to remove an electron) is e.g. in the range of at least from about 3 to about 10 eV, or from about 4 to about 9 eV. For example, the VDE is generally at least about 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, or 9.0, including each 0.01 decimal value in between (e.g. 4.11, 4.12, 4.13, 4.14, 4.15, and so on up to 9.00).

In applications having lithium, the binding energy of Li⁺ affinity to the anionic portion of the electrolytes is sufficiently low to permit the ready detachment and flow of Li⁺ cations in polarized solutions in which the electrolytes are dissolved. For example, $\Delta E_{Li}^+$ of the compounds of the invention generally range from about 4.0 to about 10.0 eV, and generally are about 4.5 to about 9.5 eV, e.g. about 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.4, 7.4 7.5 eV, and so on up to 9.5 eV including each 0.01 decimal value in between (e.g. 5.51, 5.52, 5.53, 5.54, 5.55 eV, and so on up to about 9.50 eV).

In applications having magnesium, the binding energy of Mg²⁺ affinity to the anionic portion of the electrolytes is sufficiently low to permit the ready detachment and flow of Mg²⁺ cations in polarized solutions in which the electrolytes are dissolved. For example, $\Delta E_{Mg}^{2+}$ of the compounds of the invention generally range from about 15.0 to about 25.0 eV, and generally are about 15.5 to about 24.5 eV, e.g. about 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.4, 17.4 17.5 eV, and so on up to 24.5 eV including each 0.01 decimal value in between (e.g. 15.51, 15.52, 15.53, 15.54, 15.55 eV, and so on up to about 24.50 eV).

In applications having sodium, the binding energy of Na⁺ affinity to the anionic portion of the electrolytes is sufficiently low to permit the ready detachment and flow of Na⁺ cations in polarized solutions in which the electrolytes are dissolved. For example, $\Delta E_{Na}^+$ of the compounds of the invention generally range from about 2 to about 6 eV, and generally are about 3 to about 5 eV, e.g. about 3, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0 including each 0.01 decimal value in between (e.g. 3.11, 3.12, 3.13, 3.14, 3.15 eV, and son on up to about 5.00 eV).

The binding affinity of the electrolytes described herein towards water is also favorably low for their use, and is generally in the range of at most from about 1.5 to about 0.85 eV, or from about 1.10 to about 0.90 eV, e.g. is generally at most about 1.10, 1.09, 1.08, 1.07, 1.06, 1.05, 1.04, 1.03, 1.02, 1.01, 1.00, 0.99, 0.98, 0.97, 0.96, 0.95, 0.94, 0.93, 0.92, 0.91, or 0.90 eV, and may be lower.

Anions and/or categories of anions that make up the negatively charged portion of the electrolytes of the invention include but are not limited to: $NB_{12}(CN)_{12}{}^{2-}$, $CB_{11}(CN)_{12}{}^-$, $CB_{11}(CN)_{12}{}^-$, $O(BH_4)$, $ONO_3$, $OCN$, and $OSCN$. In some aspects, the anion has a general formula $RB_xA_y$, wherein R may be present or absent and if present is a C atom, x and y range from 1-12, and A is CN or SCN. In other aspects, the anion has the general formula OA wherein A is any superhalogen. For example, A can be represented by the general formula $OB_xH_y$, wherein x and y range from 1-12.

A schematic representation of a metal ion battery of the invention is depicted in FIG. 1. In FIG. 1, metal ion battery 10 is comprised of anode 20, cathode 30 and separator 40. Anode 20 and cathode 30 are connected via closed external circuit 50, through which current flows to perform useful work. Electrolyte 100 comprises the compounds described herein. Anode 20 (the negative electrode) may be formed from any suitable material(s), examples of which include but are not limited to: graphite, lithium, $Fe_3O_4$ nano materials, etc. Cathode 30 (the positive electrode) may be formed from any suitable material(s), examples of which include but are not limited to: a layered oxide (such as lithium cobalt oxide), a polyanion (such as lithium iron phosphate) a spinel (such as lithium manganese oxide), etc. Separator 40 may be formed from, for example, nonwoven fibers (cotton, nylon, polyesters, glass), polymer films (polyethylene, polypropylene, poly (tetrafluoroethylene), polyvinyl chloride, naturally occurring substances (rubber, asbestos, wood), and the like. Pores of the separator are of sufficient size to allow the ions of the electrolyte to pass through.

The electrolytes described herein may be used in any suitable type of Li-ion, Na-ion, or Mg-ion battery. Exemplary types include, for example, lithium cobalt oxide, lithium manganese oxide, lithium iron phosphate, lithium nickel manganese cobalt oxide, lithium nickel cobalt, aluminum oxide, and lithium titanate, to name a few. The batteries may be of any suitable size or shape, and may be used alone or in a series. Various designs and styles of Li-ion batteries are described, for example, in issued U.S. Pat. No. 9,136,537 (Moon, et al.), U.S. Pat. No. 9,123,957 (Kim, et al.), U.S. Pat. No. 9,118,045 (Marshall, et al.), U.S. Pat. No. 9,105,909 (Ha, et al.), U.S. Pat. No. 9,112,221 (Park, et al.), U.S. Pat. No. 9,088,036 (Roh, et al.), the complete contents of each of which are hereby incorporated by reference in entirety. The present electrolytes may be employed in any such design or type of metal-ion battery.

Figure 2:
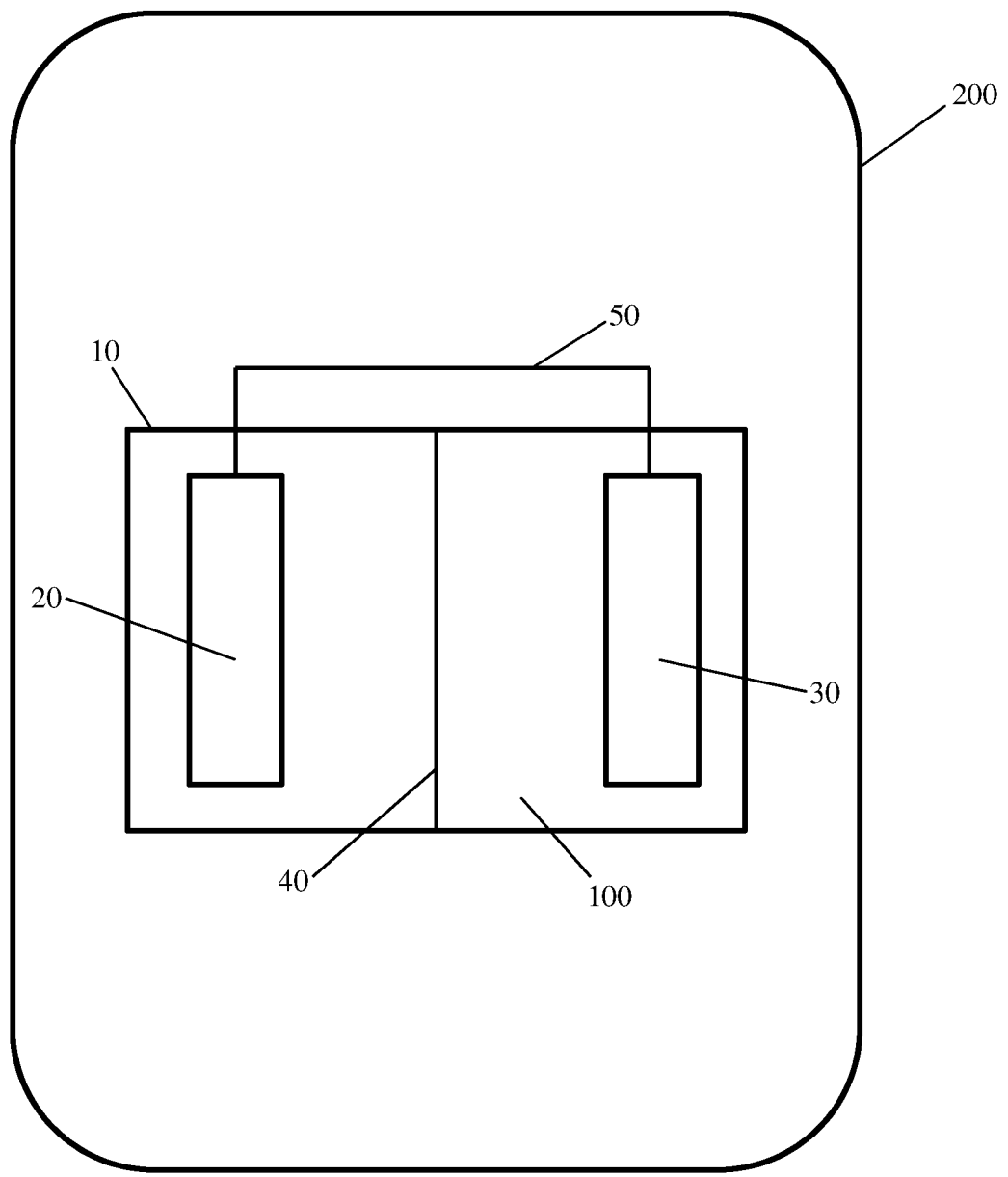
FIG. 2. Schematic representation of a device that is powered by a metal ion battery comprising an electrolyte of the invention.

The metal ion batteries described herein have a wide range of applications, which include but are not limited to: rechargeable devices such as mobile computing devices, cell phones, tools, watches, electric vehicles (e.g. cars, airplanes, etc.), A schematic representation of a device comprising (e.g. powered by) a metal ion battery of the invention is shown in FIG. 2. The notation for metal ion battery 10 is the same as described above, and the device per se is indicated as device 200.

This new class of halogen-free negative ions can also be used in the design and synthesis of hybrid solar cells.

It is to be understood that this invention is not limited to particular embodiments described, as such may, of course, vary. It is also to be understood that the terminology used herein is for the purpose of describing particular embodiments only, and is not intended to be limiting.

Where a range of values is provided, it is understood that each intervening value between the upper and lower limit of that range (to a tenth of the unit of the lower limit) is included in the range and encompassed within the invention, unless the context or description clearly dictates otherwise. In addition, smaller ranges between any two values in the range are encompassed, unless the context or description clearly indicates otherwise.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

EXAMPLES

Example 1

Colossal Stability of $B_{12}(CN)_{12}{}^{2-}$ and Its Implication for Li/Mg Ion Batteries Abstract: Multiply charged negative ions are seldom stable in the gas phase. Electrostatic repulsion leads either to auto-detachment of electrons or fragmentation of the parent ion. With a binding energy of the second electron at 0.9 eV, $B_{12}H_{12}{}^{2-}$ is a classic example of a stable dianion. Here, we show that ligand substitution can lead to unusually stable multiply charged anions. For example, dodecacyanododecaborate $B_{12}(CN)_{12}{}^{12-}$ created by substituting H by CN is found to be highly stable with the second electron bound by 5.3 eV, six times larger than that in the $B_{12}H_{12}{}^{2-}$. Equally important is the observation that $CB_{11}(CN)_{12}{}^-$ which contains one electron more than needed to satisfy the Wade-Mingos rule is also stable with its second electron bound by 1.1 eV, while $CB_{11}H_{12}{}^{2-}$ is unstable. The ability to stabilize multiply charged anions in the gas phase by ligand manipulation demonstrates that multiply charged species can be used in halogen-free electrolytes in ion batteries.

Introduction: Study of multiply charged molecular ions has a long history because of their importance in fundamental interstellar chemistry as well as in coordination chemistry. Stabilized by the presence of charge-compensating counter ions, multiply charged negative ions primarily exist in solutions or in crystals such as Zintl phase compounds.[1,2] However, it is difficult to stabilize these species in the gas phase due to electrostatic repulsion between the excess charges.[3] This is particularly true for small multiply charged anions that either lose electrons (auto-detachment) or fragment without encountering significant energy barriers. Thus, finding ways to stabilize multiply charged ions in the gas phase is a long-standing challenge.[4,5]

One classic example of a multiply charged di-anion that is stable in the gas phase is the icosahedral $B_{12}H_{12}^{2-}$ molecule where the binding energy of the first (second) electron is 4.6 eV (0.9 eV).[6,7] The stability of $B_{12}H_{12}^{2-}$ cage is governed by the Wade-Mingos rule.[8-11] According to this rule, (n+1) pairs of electrons are necessary for cage bonding where n is the number of vertices on the boron icosahedral cage. It has recently been shown that highly stable di-anions forming a sandwich complex can also be created in the gas phase by simultaneously satisfying multiple electron counting rules. For example, a multidecker $Cr[BC_5(CN)_6]_2^{2-}$ organo-metallic complex thatsimultaneously satisfies the octet rule (of CN moiety), aromatic Hückle's rule (of organic $BC_5$ moiety), and 18-electron rule (of Cr atom) is very stable with the second electron bound by 2.58 eV.[12] Previous theoretical study also showed that $TeF_8^{2-}$ is a very stable dianion with the second electron bound by ~5 eV.[13]

Here, we propose that ligand manipulation can lead to unusually stable di-anions having icosahedral cage structure. The importance of ligand engineering in stabilizing a mono-anion has already been demonstrated in the case of benzene ($C_6H_6$). Replacing its ligand H by F or CN increases the EA of $C_6H_6$ from −1.15 eV to 0.75 eV in $C_6F_6$ and 3.53 eV in $C_6(CN)_6$.[14] Here, we consider closo-borane $B_{12}H_{12}^{2-}$ as an exemplary system. We note that a previous study has shown that substitution of H in $B_{12}H_{12}^{2-}$ by halogens (F, Cl, Br, and I) can increase the stability of diaion.[15] Here we show that replacement of H with CN can lead to halogen-free $B_{12}(CN)_{12}^{2-}$ with colossal stability. The binding energy of the second electron in $B_{12}(CN)_{12}^{2-}$ is 5.3 eV, which is about factor of six larger than the corresponding binding energy in $B_{12}H_{12}^{2-}$. No other molecule exists whose stability as a di-anion is as high as that of $B_{12}(CN)_{12}^{2-}$. We also show another unusual property resulting from ligand engineering. Consider $CB_{11}H_{12}$, the carborane. This molecule needs only one extra electron to satisfy the Wade-Mingos rule.[8-11] Consequently, the EA of $CB_{11}H_{12}$ should be high. Indeed, previous study found that its EA is 5.39 eV,[16] higher than that of any halogen atom. Hence $CB_{11}H_{12}$ is a superhalogen. When a second electron is added, $CB_{11}H_{12}^{2-}$ becomes unstable as it no longer satisfies the Wade-Mingos rule. We find that $CB_{11}(CN)_{12}^{2-}$ which is isoelectronic with $CB_{11}H_{12}^{2-}$ is more stable than its mono-anion by as much as +1.07 eV. This further demonstrates the power of ligand engineering. We show that these unusual results can have technological applications in the design of halogen-free electrolytes in Li/Na/Mg ion batteries with improved performance.

Methods: Our results are obtained using first-principles calculations based on density functional theory (DFT). We used hybrid functional B3LYP for exchange-correlation potential[22,23] and the 6-31+G(d,p) basis set for all the atoms embedded in the Gaussian 03 code.[24] All geometries were fully optimized without any symmetry constraint. The total energies and forces were converged to $2.7 \times 10^{-5}$ eV and 0.02 eV/Å, respectively. Frequency analyses were performed to ensure that the structure belongs to a minimum on the potential energy surface. Charge analysis was carried out using the natural bond orbital (NBO) method.[25,26] To check the sensitivity of our results to numerical procedure we have repeated our calculations using the Vienna ab initio simulation package (VASP)[27] and HSE06 form hybrid functional for exchange-correlation potential.[28] Computations of the geometries and total energies were carried out using a plane-wave basis set with energy cutoff of 400 eV. Vacuum space of 15 Å in x, y, and z directions was applied and the reciprocal space was represented by the Γ point. The results obtained using these two different methods agree with each other, giving us confidence in the numerical results and the predictive power of our approach.

Results: To obtain the equilibrium geometries of $B_{12}(CN)_{12}$ molecules it is a priori not clear whether CN will bind to B with its C or N atom. Therefore, we optimized the structures by taking into consideration both possibilities. We found that $B_{12}(CN)_{12}$ with N atoms bound to B atoms is 5.48 eV higher in energy than the structure where C atoms are bound to B atoms. We also allowed the possibility that the CN ligands attached to adjoining B atoms may buckle and dimerize. Following relaxation, the CN ligands did not dimerize and pointed radially outward. In FIG. 3(a, b, c) we show the optimized geometries corresponding to the lowest energy isomers of the neutral, mono-anion and di-anion of $B_{12}(CN)_{12}$, respectively. The ground state of neutral $B_{12}(CN)_{12}$ has a $D_{3d}$ point group symmetry with average B—B, B—C, and C—N bond lengths of 1.79, 1.52, and 1.17 Å, respectively. The symmetry increases to $T_d$ ($I_h$) when the first (second) electron is attached. The average B—B, B—C, and C—N bond lengths of $B_{12}(CN)_{12}^{2-}$ are 1.80, 1.54, and 1.16 Å, respectively. Note that the charge state of $B_{12}(CN)_{12}$ has minimal effect on these bond lengths. The binding energies of the first and second electron, calculated using both Gaussian 03 and VASP codes, are given in Table 1. These energies are defined as, $$\Delta E_1 = E(X) - E(X^-)$$

$$\Delta E_2 = E(X) - E(X^{2-}).$$

Here X represents the molecule in question [$B_{12}(CN)_{12}$ or ($B_{12}H_{12}$)]. Note that the binding energies calculated using both the real space (Gaussian 03) and reciprocal space (VASP) approaches agree well with each other. Consequently, for the remainder of the calculations and discussions we only present results obtained using the Gaussian 03 code. The binding energy of the first electron, $\Delta E_1$ for $B_{12}(CN)_{12}$ is almost twice that of $B_{12}H_{12}$, while $\Delta E_2$ for the second electron (5.28 eV for $B_{12}(CN)_{12}$) is six times as large (0.86 eV for $B_{12}H_{12}$). We attribute this enhancement of binding energies in $B_{12}(CN)_{12}^{2-}$ to two reasons: First, the electron affinity of the CN ligand is 3.86 eV which is much larger than that of H, namely, 0.75 eV. The second reason is the size effect. As the size of the molecule increases, the electrostatic repulsion between excess charges decreases, hence enhancing the stability of the larger di-anion. We define the diameter (d) of $I_h$ $B_{12}(CN)_{12}^{2-}$ (and $B_{12}H_{12}^{2-}$) as the distance between the two opposite N (and H) atoms. The diameter of $B_{12}(CN)_{12}^{2-}$ is 8.83 Å which is larger than that of $B_{12}H_{12}^{2-}$ (5.81 Å).

TABLE 1

The binding energies (in eV) of the 1st and
2nd electron of the studied di-anions.

|  |  | $B_{12}H_{12}$ | $B_{12}(CN)_{12}$ | $CB_{11}(CN)_{12}$ |
|---|---|---|---|---|
| $\Delta E_1$ | (G03/VASP) | 4.57/4.68 | 8.56/8.77 | 8.72/8.90 |
| $\Delta E_2$ | (G03/VASP) | 0.86/0.97 | 5.28/5.51 | 1.07/1.29 |

In order to check its thermodynamic stability, we also performed ab initio molecular dynamics (AIMD) simulation using the Nosé-Hoover heat bath scheme[17] with the average temperature of the system at 1000 K. Time step is set to 1 femtosecond. After 3500 simulation steps (3.5 picoseconds), the $B_{12}(CN)_{12}{}^{2-}$ only exhibit slight distortions and can be optimized back to its ground state at 0 K, establishing its thermodynamic stability (FIG. 3d).

According to our NBO analysis, in the neutral $B_{12}(CN)_{12}$, each CN receives 0.04 electrons on average from the B cage, consistent with electronegative character of CN. The average valence electron configuration of each B, C, and N are $2s^{0.58}2p^{2.36}$, $2s^{0.92}2p^{2.93}$, and $2s^{1.60}2p^{3.52}$, respectively. In order to explore the nature of the excess electron distribution we calculated the electron deformation density of $B_{12}(CN)_{12}$ between different charge states (FIGS. 4a and 4b). We observe that from the neutral state to mono-anion, and from mono-anion to di-anion, the excess electrons distribute primarily on the CN ligands. To be specific, when forming mono-anion $B_{12}(CN)_{12}{}^-$, the α-spin electron configuration of each B, C, and N are $2s^{0.28}2p^{1.22}$, $2s^{0.46}2p^{1.45}$, and $2s^{0.80}2p^{1.83}$, respectively, while the corresponding electron configurations of β-spin are $2s^{0.28}2p^{1.18}$, $2s^{0.46}2p^{1.45}$, and $2s^{0.80}2p^{1.78}$, respectively.

This means that each CN pair receives ~0.08 electrons on average, and the B cage obtains ~0.02 electrons. When the second electron is attached, the electron configurations of each B, C, and N are $2s^{0.56}2p^{2.44}$, $2s^{0.92}2p^{2.86}$, and $2s^{1.59}2p^{3.70}$, respectively, suggesting that each CN pair and B atom gain ~0.13 and 0.03 electrons on average, respectively. The larger electron gain on CN is consistent with its high electronegativity. The NBO charge distribution of $B_{12}(CN)_{12}{}^{2-}$ is given in FIG. 4c.

The electronic structure of $B_{12}(CN)_{12}{}^{2-}$ is further explored by calculating its energy level (FIG. 5). The highest occupied molecular orbital (HOMO) and lowest unoccupied molecular orbital (LUMO) are both 4-fold degenerate with $G_u$ and $G_g$ symmetry, respectively. The HOMO-LUMO gap is estimated to be 6.44 eV. This large value confirms the unusual stability of the di-anion in the gas phase. We also calculate and plot the wave functions of HOMO and LUMO. Both of these have distributions on the B cage, but show different behavior on the ligands. The HOMO on the CN is more delocalized with π character while the LUMO is localized on N with p character.

Having demonstrated the colossal stability of $B_{12}(CN)_{12}{}^{2-}$ originating from the substitution of H by a highly electronegative ligand CN, we now focus on the stability of $CB_{11}(CN)_{12}{}^{2-}$. To demonstrate the effect of the ligand we begin with a study of the stability of $CB_{11}H_{12}{}^{2-}$. The binding energy of the second electron ($\Delta E_2$) in $CB_{11}H_{12}{}^{2-}$ is found to be −3.26 eV. Thus, $CB_{11}H_{12}{}^{2-}$ is unstable against auto-detachment of an electron. This is expected as the molecule contains one electron more than needed to satisfy the Wade-Mingos electron shell closure rule. Would substitution of H by CN change this scenario? To study this, we optimized the geometries of neutral, mono-anionic, and di-anionic forms of $CB_{11}(CN)_{12}$. The results are given in FIG. 6(a, b, c). After full geometry relaxation we observe that the replacement of B by C (denoted as $C_B$) reduces the symmetry of the system compared to $B_{12}(CN)_{12}$. The neutral $CB_{11}(CN)_{12}$ has a $C_s$ point group symmetry. The average bond lengths between C and B is 1.52 Å and that between C and $C_B$ is 1.44 Å. The average $C_B$—B and B—B bond lengths are found to be 1.75 and 1.81 Å, respectively. When one electron is attached, the $CB_{11}(CN)_{12}{}^-$ has $C_5$ point group symmetry. The binding energy of the added electron, $\Delta E_1$ given by Eq. (1) is 8.72 eV (Table 1). This value is much larger than that in the case of $CB_{11}H_{12}$, namely, 5.36 eV. When we add the second electron into the system, we find that the $CB_{11}(CN)_{12}{}^{2-}$ is distorted further around the $C_B$ site and the point group symmetry reduces to $C_1$. The average B—B bond length around the $C_B$ site is 1.86 Å, while the average $C_B$—B bond length on the cage is 1.84 Å. Surprisingly, the binding energy of the second electron $CB_{11}(CN)_{12}{}^{2-}$ is +1.07 eV. This means that $CB_{11}(CN)_{12}{}^{2-}$ is stable against auto-detachment of the electron. This is contrary to expectation as $CB_{11}(CN)_{12}{}^{2-}$ like $CB_{11}H_{12}{}^{2-}$ contains one extra electron than needed to satisfy the Wade-Mingos electron counting rule. Thus, replacement of H by CN not only increases the magnitude of the electron binding energy, but also stabilizes a multiply charged di-anion against its electron shell closure rule. Due to the odd number of total electrons, $CB_{11}(CN)_{12}{}^{2-}$ has a magnetic moment of $1\mu_B$ which is distributed over the entire system (FIG. 6b).

According to the NBO analysis each B in the neutral $CB_{11}(CN)_{12}$ cage loses 0.08 electrons on the average. The $C_B$ site gains 0.57 electrons while each CN pair receives 0.03 electrons. In $CB_{11}(CN)_{12}{}^-$ each CN pair gains 0.09 electrons on the average, each B atom loses 0.06 electrons, and the charge state of $C_B$ remains almost unchanged. In $CB_{11}(CN)_{12}{}^{2-}$ the CN ligands also receive most of the charge, the charge state of $C_B$ becomes −0.67, and the B atoms continue to loose electrons (FIG. 6c). The high electronegativity of CN ligands is the main reason for the large first and second EA of $CB_{11}(CN)_{12}$. The energy diagram and molecular orbitals of $CB_{11}(CN)_{12}{}^{2-}$ are shown in FIG. 4d. We see that HOMO and LUMO are in spin up and spin down channels, respectively, with a gap of 1.62 eV.

Very recently it was proposed that $CB_{11}H_{12}{}^-$ can work as a high performance halogen-free electrolyte in Li-ion batteries due to its smaller binding energy with cations (e.g. Li$^+$ binding energy with $CB_{11}H_{12}{}^-$ is only ~5.08 eV)[18] than those in currently used electrolytes in Li-ion batteries. This theoretical prediction has already been confirmed experimentally in Li/Mg-ion batteries.[19,20] We note that the binding energy of the cation to the anion depends on the size of the anion. As the anion size increases, the distance between the cation and anion would increase and the binding energy should decrease. Since the diameter of $B_{12}(CN)_{12}{}^{2-}$ (~8.8 Å) is larger than those of $CB_{11}H_{12}{}^-$ and $B_{12}H_{12}{}^{2-}$ (~5.8 Å), we expect that the binding energy of the cations (Li$^+$ or me) to be reduced, thus improving the battery performance. To get a quantitative estimate of the cation binding energy, we have optimized the geometries of Li$_2$X, LiX, and MgX where X=$B_{12}H_{12}$, $B_{12}(CN)_{12}$ and calculated the energies necessary to remove the first and second Li ion as well as the Mg ion, $$\Delta E_{Li1} = E(Li^+) + E(Li_1X^-) - E(Li_2X),$$

$$\Delta E_{Li2} = E(Li^+) + E(X^{2-}) - E(Li_1X^-),$$

$$\Delta E_{Mg} = E(Mg^{2+}) + E(X^{2-}) - E(MgX).$$

$\Delta E_{Li1}$ and $\Delta L_{Li2}$ are the dissociation energies when the first and second Li$^+$ ions are removed from the stable salt $Li_2X$. $\Delta E_{Mg}$ is the similar dissociation energy in MgX. The optimized structures of Li/Mg salts are given in FIG. 7. For the Li salts, we find that the Li atoms prefer to adsorb on the center of the islands formed by the three N (or H) atoms on the opposite sites of the cage. Our calculated dissociation energies are summarized in Table 2. $\Delta E_{Li1}$ and $\Delta E_{Li2}$ for $Li_2B_{12}H_{12}$ are 5.91 and 9.03 eV, respectively. These are consistent with previous results (5.94 eV and 9.00 eV respectively).[18] These values are both higher than that in previously proposed $LiCB_{11}H_{12}$,[18] hence $Li_2B_{12}H_{12}$ was judged not to be a good candidate for electrolyte in Li-ion battery. As for $Li_2B_{12}(CN)_{12}$, the calculated $\Delta E_{Li1}$ and $\Delta E_{Li2}$ are 4.66 and 6.83 eV, respectively. These are significantly lower than those in $Li_2B_{12}H_{12}$, and lie in the range for electrolytes used in current Li-ion batteries.[18] For the Mg salts, the $\Delta E_{Mg}$ for $B_{12}H_{12}$ and $B_{12}(CN)_{12}$ are found to be 21.31 eV and 17.46 eV respectively. Again $MgB_{12}(CN)_{12}$ would be a better candidate for an electrolyte in Mg-ion battery than

TABLE 2

Dissociation energies in Li salts $\Delta E_{Li1}$, $\Delta E_{Li2}$, and in Mg salts $\Delta E_{Mg}$.

| | $\Delta E_{Li1}$ (eV) | $\Delta E_{Li2}$ (eV) | | $\Delta E_{Mg}$ (eV) |
|---|---|---|---|---|
| $Li_2B_{12}H_{12}$ | 5.91 | 9.03 | $MgB_{12}H_{12}$ | 21.31 |
| $Li_2B_{12}(CN)_{12}$ | 4.66 | 6.83 | $MgB_{12}(CN)_{12}$ | 17.46 |
| $LiCB_{11}(CN)_{12}$ | 4.09 | | $MgCB_{11}(CN)_{12}$ | 18.30 |
| $Li_2CB_{11}(CN)_{12}$ | 4.67 | 6.89 | | |

We have also explored the potential of $CB_{11}(CN)_{12}$ as an electrolyte. As pointed out in the above, recently was predicted to be a good halogen-free electrolyte. To examine if $CB_{11}(CN)_{12}^-$ may be a better candidate for electrolyte than $CB_{11}H_{12}^-$ we calculated the binding energy of Li in $LiCB_{11}(CN)_{12}$ salt. This binding energy, namely 4.09 eV, is smaller than that in $LiCB_{11}H_{12}$ (5.08 eV). This implies that it will be easier to detach $Li^+$ from $LiCB_{11}(CN)_{12}$ than that from $LiCB_{11}H_{12}$. The other advantage of $CB_{11}(CN)_{12}$ is that it is stable also as a di-anion. This means that electrolytes such as $Li_2CB_{11}(CN)_{12}$ and $MgCB_{11}(CN)_{12}$ are also be useful. The advantage of the former is that current density can be higher than that in $LiCB_{11}H_{12}$. The calculated binding energy of the two Li atoms in $Li_2CB_{11}(CN)_{12}$ are $\Delta E_{Li1}$=4.67 eV and $\Delta E_{Li2}$=6.89 eV which are also significantly lower than those in $Li_2B_{12}H_{12}$. The binding energy of $Mg^{2+}$ in $MgCB_{11}(CN)_{12}$ is 18.30 eV which is also significantly lower than that in $MgB_{12}H_{12}$ (21.31 eV) and comparable to that in $MgB_{12}(CN)_{12}$ (17.46 eV).

In summary, we show that ligand engineering can lead to some remarkable results. Closo-borane $B_{12}H_{12}^{2-}$ known for its stability as di-anion in the gas phase can be made unusually more stable by replacing H with CN. For example, the binding energy of the second electron in $B_{12}(CN)_{12}^{2-}$ is 5.3 eV which is about six times larger than that in $B_{12}H_{12}^{2-}$. No other molecule of this size exists that is more stable as a di-anion than $B_{12}(CN)_{12}^{2-}$. Equally important is our observation that $CB_{11}(CN)_{12}^{2-}$ is also stable with the second electron bound by 1.07 eV. This was not expected as $CB_{11}(CN)_{12}^{2-}$ contains one electron more than necessary to satisfy the Wade-Mingos electron shell closure rule. In chemistry, several electron counting rules such as octet rule, 18-electron rule, aromatic rule, and Wade-Mingos rule exist that account for the stability of many molecules. These rules are routinely used to design both stable and reactive species. Our studies show that ligand engineering is another option that can yield similar results. Application of these unusually stable multiply charged anions in the design and synthesis of halogen-free electrolytes in Li/Na/Mg ion batteries is also presented. We show that $LiCB_{11}(CN)_{12}$, $Li_2CB_{11}(CN)_{12}$, $Li_2B_{12}(CN)_{12}$, $MgB_{12}(CN)_{12}$, and $MgCB_{11}(CN)_{12}$ possess better properties as electrolytes in metal ion batteries than those where CN molecules are replaced by H atoms. Our results are based on density functional theory whose predictive power has already been proven experimentally.

REFERENCES FOR EXAMPLE 1

[1] E. Zintl, J. Goubeau, W. Dullenkopf, Z. Phys. Chem., Abt. A 1931, 154, 1-46.
[2] E. Zintl, H. Kaiser, Z. Anorg. Allg. Chem. 1933, 211, 113-131.
[3] G. L. Gutsev, A. I. Boldyrev, J. Phys. Chem. 1990, 94, 2256-2259.
[4] A. Dreuw, L. S. Cederbaum, Chem. Rev. 2002, 102, 181-200.
[5] A. I. Boldyrev, M. Gutowski, J. Simons, Acc. Chem. Res. 1996, 29, 497-502.
[6] S. Li, M. Willis, P. Jena, J. Phys. Chem. C 2010, 114, 16849-16854.
[7] M. L. McKee, Z. X. Wang, P. V. R. Schleyer, J. Am. Chem. Soc. 2000, 122, 4781-4793.
[8] K. Wade, J. Chem. Soc. D 1971, 792-793.
[9] K. Wade, Adv. Inorg. Chem. Radiochem. 1976, 18, 1-66.
[10] D. M. P. Mingos, Acc. Chem. Res. 1984, 17, 311-319.
[11] D. M. P. Mingos, R. L. Johnston, Struct. Bond. 1987, 68, 29-87.
[12] S. Girl, B. Z. Child, J. Zhou, P. Jena, RSC Adv. 2015, 5, 44003-44008.
[13] A. I. Boldyrev, J. Simons, J. Chem. Phys. 1992, 97, 2826-2827.
[14] B. Z. Child, S. Girl, S. Gronert, P. Jena, Chem. Eur. 1 2014, 20, 4736-4745.
[15] R. T. Boere, J. Derendorf, C. Jenne, S. Kacprzak, M. KeBler, R. Riebau, S. Riedel, T. L. Roemmele, M. Rilhle, It Scherer, T. Vent-Schmidt, J. Warneke, S. Weber, Chem. Eur. J 2014, 20, 4447-4459.
[16] B. Pathak, D. Samanta, R. Ahuja, P. Jena, Chem Phys Chem 2011, 12, 2423-2428.
[17] S. Nosé, J. Chem. Phys. 1984, 81, 511-519.
[18] S. Giri, S. Behera, and P Jena, Angew. Chem. Int. Ed. 2014, 126, 14136-14139.
[19] Q. Tutusaus, R. Mohtadi, T. S. Arthur, F. Mizuno, E. G. Nelson, Y. V. Sevryugina, Angew. Chem. Int. Ed. 2015, 54, 7900-7904.
[20] W. S. Tang, A. Unemoto, W. Zhou, V. Stavila, M. Matsuo, H. Wu, S. Orimo, T. J. Udovic, Energy Environ. Sci. 2015, 8, 3637-3645.
[21] J. Warneke, T. Dulcks, C. Knapp, D. Gabel, Phys Chem Chem Phys 2011, 13, 5712-5721.
[22] A. D. Becke, J. Chem. Phys. 1993, 98, 5648-5652.
[23] C. Lee, W. Yang, R. G. Parr, Phys. Rev. B. 1988, 37, 785-789.
[24] M. J. Frisch, G. W. Trucks, H. B. Schlegel, G. E. Scuseria, M. A. Robb, J. R. Cheeseman, J. A. Montgomery, Jr., T. Vreven, K. N. Kudin, J. C. Burant, J. M. Millam, S. S. Iyengar, J. Tomasi, V. Barone, B. Mennucci, M. Cossi, G. Scalmani, N. Rega, G. A. Petersson, H. Nakatsuji, M.Hada, M. Ehara, K. Toyota, R. Fukuda, J. Hasegawa, M. Ishida, T. Nakajima, Y. Honda, O. Kitao, H. Nakai, M. Klene, X. Li, J. E. Knox, H. P. Hratchian, J. B. Cross, V. Bakken, C. Adamo, J. Jaramillo, R. Gomperts, R. E. Stratmann, O. Yazyev, A. J. Austin, R.

Cammi, C. Pomelli, J. W. Ochterski, P. Y. Ayala, K. Morokuma, G. A. Voth, P. Salvador, J. J. Dannenberg, V. G. Zakrzewski, S. Dapprich, A. D. Daniels, M. C. Strain, O. Farkas, D. K. Malick, A. D. Rabuck, K. Raghavachari, J. B. Foresman, J. V. Ortiz, Q. Cui, A. G. Baboul, S. Clifford, J. Cioslowski, B. B. Stefanov, G. Liu, A. Liashenko, P. Piskorz, I. Komaromi, R. L. Martin, D. J. Fox, T. Keith, M. A. Al-Laham, C. Y. Peng, A. Nanayakkara, M. Challacombe, P. M. W. Gill, B. Johnson, W. Chen, M. W. Wong, C. Gonzalez, J. A. Pople, Gaussian 03, RevisionD.02, Gaussian, Inc., Wallingford Conn., 2004.
[25] A. E. Reed, L. A. Curtiss, F. Weinhold, *Chem. Rev.* 1988, 88, 899-926.
[26] E. D. Glendening, A. E. Reed, J. E. Carpenter, F. Weinhold, NBO Version 3.1.
[27] G. Kresse, J. Furthmuller, *Phys. Rev. B* 1996, 54, 11169-11186.
[28] (a) J. Heyd, G. E. Scuseria, M. Ernzerhof, *J Chem. Phys.* 2003, 118, 8207-8215; (b) J. Heyd, G. E. Scuseria, M. Ernzerhof, *J. Chem. Phys.* 2006, 124, 219906-1.

Example 2

$B_{12}(SCN)_{12}^{2-}$: An Ultra-Stable Weakly-Coordinating Dianion for Electrolyte Salts in Metal-Ion Batteries Abstract: Stable dianions as components of electrolytes in today's rechargeable metal-ion batteries are rare. In this example, we show that thiocyanate $SCN^-$ anion known for its detoxification property of cyanide $CN^-$ and anti-degradation property of perovskite solar cell materials, can also be used to synthesize a new family of weakly-coordinating $B_{12}(SCN)_{12}^{2-}$ dianion complexes which are useful for electrolyte salts in metal-ion batteries, such as the magnesium-ion battery.

Introduction: Complex metal borohydrides, that have been considered for some time as hydrogen storage materials, have found a niche application as solid state electrolytes in metal-ion batteries [10]. Recently Giri et al. [7] proposed several halogen-free electrolytes for LIBs. Among these $LiCB_{11}H_{12}$ was shown to have the best characteristics due to its weaker affinity to the lithium ion and less sensitivity to moisture. Recent experiments by Tutusaus et al. and Tang et al. [4, 11] have confirmed the exceptional properties of $CB_{11}H_{12}^-$ (monocarborane) as anionic components of electrolytes for Mg and Na ion batteries, respectively.

In Example 1, we predicted the unusual stability of another di-anion, $B_{12}(CN)_{12}^{2-}$ formed by replacing the H ligands in $B_{12}H_{12}^{2-}$ by CN moieties. However, the cyanide ion $CN^-$ is highly toxic which may make it difficult to synthesize $B_{12}(CN)_{12}^{2-}$ and add to the production cost of salts.

In this Example, we offer a solution by making use of the accumulated knowledge in biological detoxification of $CN^-$ [13] and materials design of perovskite solar cells [14]. We report a new family of non-toxic ultra-stable (di)anions with improved properties compared to even $B_{12}(CN)_{12}^{2-}$ and $CB_{11}(CN)_{12}^{2-}$. We note that the giant stability of $B_{12}(CN)_{12}^{2-}$ is achieved by satisfying two electron counting rules, simultaneously. First, the CN moiety requires one electron to satisfy the octet shell closure rule and consequently has an electron affinity of 3.9 eV that surpasses the electron affinity of any halogen atom. Thus, CN is a superhalogen [15]. Second, the enhanced stability of $B_{12}(CN)_{12}^{2-}$ is due to the Wade-Mingos rule [16-19] which requires (n+1) pairs of electrons for its cage bonding. Here n is the number of vertices in the B polyhedron. With n=12, $B_{12}(CN)_{12}^{2-}$ requires 26 electrons to stabilize its icosahedra structure. It is because of the combined effect of the octet rule (that lends stability to the superhalogen CN ligand) and the Wade-Mingos rule (that lends stability to the icosahedral cage) that $B_{12}(CN)_{12}^{2-}$ enjoys its extraordinary stability.

We replace the CN ligand in $B_{12}(CN)_{12}^{2-}$ with SCN. Note that SCN also requires one extra electron to satisfy the octet rule. Indeed, the electron affinity of SCN, namely 3.5 eV, is very similar to that of Br. Thus, one can regard SCN as a pseudo-halogen. It is known that thiocyanate, $SCN^-$, is much less toxic and can be used as an antidote of $CN^-$[13]. It has been shown experimentally that $SCN^-$ can be effectively removed from aqueous solutions by using low-cost natural waste biomass [13]. Interestingly, $SCN^-$ has recently been used to replace iodine in the organic-inorganic hybrid perovskites to produce $CH_3NH_3PbI(SCN)_2$ [14], making a leap forward in solving the long-standing problem of degradation of the perovskite solar-cell materials exposed to moisture. According to our own studies [20-21], the success of $SCN^-$ in improving the stability of $CH_3NH_3PbI_3$ organic hybrid perovskite solar cell is consistent with the role played by $Br^-$ in $CH_3NH_3PbI_2Br$ [22]. Due to the above merits of $SCN^-$ compared to $CN^-$, the production cost of metal salts made from $B_{12}(CN)_{12}^{2-}$ would be greatly reduced.

We propose $B_{12}(SCN)_{12}^{2-}$ and $CB_{11}(SCN)_{12}^-$ as negative ion components of electrolyte salts for Mg, Li, and Na-ion batteries. With the smaller electron affinity of SCN compared to that of CN the bonding polarity between the anion and the metal cation is expected to be reduced. Similarly, because of the increased volume of $B_{12}(SCN)_{12}^{2-}$ the magnitude of the interaction between the metal cation and $B_{12}(SCN)_{12}^{2-}$ or $CB_{11}(SCN)_{12}^-$ anions will be reduced even further. In addition, in terms of the interaction of $B_{12}(CN)_{12}^{2-}$ or $CB_{11}(CN)_{12}^-$ with metal cations, the highly electronegative CN and the large volume work against each other. On one hand, larger volume means smaller charge density on the ion surface and hence weaker interaction with a point-charge metal ion. On the other hand, large negative charge concentrated on CN is likely to form a polarized bond with $Li^+/Mg^{2+}$, thus increasing the strength of bonding. This may result in poor solubility of the salt in low-polarity solvents like ethers which, in the case of MIB, are the only usable solvents thus far [3-4]. Thus, electrolytes based on $B_{12}(SCN)_{12}^{2-}$ and $CB_{11}(SCN)_{12}^{2-}$ may provide an advantage.

Method: The calculations are carried out using the GAUSSIAN 03 package [29]. The hybrid density functional theory (DFT) with Becke three parameter Lee-Yang-Parr (B3LYP) [30-31] prescription for the exchange-correlation energy and 6-31+G * basis sets are used. The optimized ground states correspond to the structures with the minimum energy and without any imaginary frequency. Natural bond orbital (NBO) analysis is used to obtain the atomic charge state and the bond composition of the molecule. The intensity of the infrared-active mode is given as change of the dipole moment (in unit of km/mol) along the vibrational mode. The molecular dynamics simulations are conducted using NVT ensemble with Nose-Hoover thermostat. A large 30×30×30 Å cell is used to contain the studied anion. Simulations are conducted with normal precision in VASP [32-33] and a tolerance of $1×10^{-5}$ eV for the SCF cycle without any symmetry constraint. The time step is set to 0.001 ps. The solvation calculations are performed using the ground state of the gas phase structures within the polarisable continuum model (PCM). All anions in the solvent remain stable without imaginary frequency.

Results: To investigate the merit of $B_{12}(SCN)_{13}{}^{2-}$ and $CB_{11}(SCN)_{12}{}^{-}$ as building blocks of electrolytes with improved properties, we first calculated the geometry of neutral and negative ions of $B_{12}(SCN)_{12}$ and $CB_{11}(SCN)_{12}$. The ground state of $B_{12}(SCN)_{12}{}^{2-}$ is found to be symmetric (C, point group) with N ligated to B and each NCS branch pointing outwards radially, as shown in FIG. 8a. Its isomer where S is ligated to B (see FIG. 8b) is 13.8 eV higher in energy and adopts a non-symmetric configuration ($C_2$ point group) with the bending angle B—S—C being 107°. NBO analysis reveals that the bending (larger than the 90° with no sp mixing and smaller than 109° with $sp^a$ hybridization [23]) is due to the predominant p character (more than 75% contribution) in the B—S bond with little s mixing. On the other hand, the straight B—N—C bond in the ground state structure according to the 50:50 sp mixing of N is usually seen in the N-ligated thiocyantes [23]. Due to the high symmetry of the ground state, $B_{12}(SCN)_{12}{}^{2-}$ shows negligible dipole moment, similar to that of $B_{12}(CN)_{12}{}^{2-}$. This is advantageous, because large clusters with big dipole moment may tend to dimerize [24].

The thermodynamic stability of $B_{12}(SCN)_{12}{}^{2-}$ is tested by using molecular dynamics simulation (MDS) for 4 ps as shown in FIG. 8c. Note that thermal equilibrium at 1000 K is reached after 1 ps. FIG. 8d shows the calculated radial distribution functions (RDF) of B—B and B—N bonds obtained from the MDS trajectory data. The narrow peaks indicate a rigid structural skeleton. The main flexibility of the structure comes from the swaying motions of the —C—S branch upon thermal excitation.

The calculated second and first electron affinity (see Eq. (1) and (2)) of $B_{12}(SCN)_{12}{}^{2-}$ are 3.28 and 5.65 eV, respectively. These values are compared to those of the other boron-cage based anions in Table 3. They are large compared to those of the benchmark materials $B_{12}H_{12}{}^{2-}$ and $CB_{11}H_{12}{}^{-}$ which have already been proven to have excellent oxidative stability [3-4]. To the best of our knowledge, the value of 3.28 eV binding energy of the second electron in $B_{12}(SCN)_{12}{}^{2-}$ is the second largest value reported so far, with $B_{12}(CN)_{12}{}^{2-}$ (Example 1) being the most stable dianion known in the gas phase, and larger than those of perhalogenated dodecaborates $B_{12}X_{12}{}^{2-}$ (X=halogen) [25] and gigantic dimers $B_{24}X_{18}{}^{2-}$ (X=halogen) [26].

We go beyond $B_{12}(SCN)_{12}{}^{2-}$ and study its derivative $CB_{11}(SCN)_{12}{}^{-}$ as well as its isoelectronic $B_{12}(OCN)_{12}{}^{2-}$ for their potential as negative ion components of electrolytes. The optimized ground states of these structures are given in FIGS. 8e and 8f, respectively. For $B_{12}(OCN)_{12}{}^{2-}$, the isomer with O linked to B is 15.3 eV higher in energy than the ground state structure where N is linked to B. Both ions show excellent stability compared to the benchmark materials, as shown in Table 3. Different charge (from −2 to neutral) states of $B_{12}(SCN)_{12}$, $CB_{11}(SCN)_{12}$ and $B_{12}(OCN)_{12}$ introduce minimal structural deformation suggesting that the anion states are stabilized against the neutral state due to charge redistribution between the boron cage and the functional SCN ligand. Indeed, NBO analysis shows that, from the neutral state to the mono-anion state, each boron atom and each SCN ligand receives about 0.02 and 0.08 electrons, respectively; from the monoanion to the dianion each boron and each SCN obtains another 0.03 and 0.07 electrons, respectively. These values are similar to the case of $B_{12}(CN)_{12}$, suggesting that the electron-drawing ability of SCN is also large compared to the boron cage.

TABLE 3

First ($\Delta E_1$) and second ($\Delta E_2$) electron affinity (Eq. (1) and Eq. (2)) of $B_{12}(SCN)_{12}{}^{2-}$, $B_{12}(OCN)_{12}{}^{2-}$, and $CB_{11}(SCN)_{12}{}^{-}$ compared to other boron-cage based anions. Values of the oxidation potential are calculated in THF solvent versus the standard electrode potential $Mg^{2+}/Mg$ of 2.05 V for the dianions and $Li^+/Li$ of 1.37 V for the monoanions. A standard hydrogen electrode value of 4.42 V [27] is used.

| | $\Delta E_1$ (eV) | $\Delta E_2$ (eV) | Oxidation Potential (V) |
|---|---|---|---|
| $B_{12}H_{12}$ | 4.57 | 0.86 | 9.43 ($Mg^{2+}/Mg$) |
| $CB_{11}H_{12}{}^{a}$ | 5.99 | — | 5.54 ($Li^+/Li$); 4.86 ($Mg^{2+}/Mg$) |
| $B_{12}(SCN)_{12}$ | 5.65 | 3.28 | 10.34 ($Mg^{2+}/Mg$) |
| $B_{12}(OCN)_{12}$ | 6.01 | 3.21 | 10.67 ($Mg^{2+}/Mg$) |
| $CB_{11}(SCN)_{12}$ | 5.69 | — | 5.16 ($Li^+/Li$); 4.48 ($Mg^{2+}/Mg$) |
| $B_{12}(CN)_{12}{}^{b}$ | 8.56 | 5.28 | 15.95 ($Mg^{2+}/Mg$) |
| $CB_{11}(CN)_{12}{}^{b}$ | 8.72 | 1.07 | 13.16 ($Mg^{2+}/Mg$) |

$^a$Ref [7].
$^b$Ref [12].

To calculate the binding of $B_{12}(SCN)_{12}{}^{2-}$ and its derivatives with metal ions, we first determined the ground-state structures of the corresponding salts, namely, $[LiB_{12}(SCN)_{12}]^-$, $Li_2B_{12}(SCN)_{12}$, $LiCB_{11}(SCN)_{12}$ and $MgB_{12}(SCN)_{12}$. The bonding pattern between the anion and the metal cation is same as that involving $B_{12}(CN)_{12}{}^{2-}$, namely, each metal cation is held by three ligand branches. We then calculate the energy cost, $E_b$, to dissociate the metal ion from the anion by using the equation, $$E_b = E_{dianion} + E_{mc} - (E_{salt} - E_d) \quad (3)$$

where $E_d$ is the energy cost due to the distortion of the dianion caused by binding with the metal ion, $E_{dianion}$ is the ground-state energy of the dianion, $E_{mc}$ is the energy of the metal cation, and $E_{salt}$ is the ground-state energy of the salt. We rewrite Eq. (3) as $$E_b = E_{dissociation} + E_d = (E_{dianion} + E_d) + E_{mc} - E_{salt} = E_{distort} + E_{mc} - E_{salt} \quad (4)$$

Here $E_{dissociation}$ is the dissociation energy defined as the sum of the energy of the anion and the metal ion minus the energy of the corresponding salt. $E_{distort}$ is the energy of the dianion at the distorted configuration (caused by binding to the metal cation). The calculated $E_b$ for the studied salts are given in Table 4. It is clear that $B_{12}(SCN)_{12}{}^{2-}$ and $CB_{11}(SCN)_{12}{}^{-}$ salts require the least energy to dissociate into $Li^+$ or $Mg^{2+}$, especially compared to the benchmark salts containing $B_{12}H_{12}{}^{2-}$ and $CB_{11}H_{12}{}^{-}$.

TABLE 4

Calculated energy $E_b$ (eV) to dissociate the metal ion ($Li^+/Mg^{2+}$) from the studied salts. The energy to dissociate $Mg^{2+}$ from the studied dianions in the solvent THF is also given.

| Li-salt | $Li^+$ (1st) | $Li^+$ (2nd) | Mg-salt | $Mg^{2+}$ | @THF |
|---|---|---|---|---|---|
| $Li_2B_{12}H_{12}$ | $5.91^a$ | $9.03^a$ | $MgB_{12}H_{12}$ | 21.19 | 1.73 |
| $LiCB_{11}H_{12}$ | 5.40 | — | $Mg(CB_{11}H_{12})_2$ | 20.38 | 1.27 |
| $Li_2B_{12}(CN)_{12}$ | 5.16 | 7.44 | $MgCB_{11}(CN)_{12}$ | 19.70 | 1.07 |
| $Li_2B_{12}(SCN)_{12}$ | 5.07 | 6.89 | $MgB_{12}(CN)_{12}$ | 18.29 | 0.51 |
| $Li_2CB_{11}(CN)_{12}$ | $4.67^a$ | 7.65 | $MgB_{12}(SCN)_{12}$ | 18.37 | 0.39 |
| $LiCB_{11}(SCN)_{12}$ | $4.40^a$ | — | | | |

$^a$Values of $E_{dissociation}$ in Eq. (4).

We further consider the properties of the studied anions in solution. For MIB, the only known solvent that is compatible with Mg is ether [3-4]. In our calculations we therefore adopt tetrahydrofuran (THF, $C_4H_8O$, $\varepsilon = 7.52$) which has been used in experiments [3-4] as the solvent (see the Method section). The computed oxidation potentials of the anions in THF are given in Table 8. For the dianions, the values are reported versus the $Mg^{2+}/Mg$ standard electrode potential of $(4.42-2.372\approx)$ 2.05 V [28]. The reported values for the monoanions are converted to $Li^+/Li$ (1.37 V) scale. The oxidation potentials of the dianions increase significantly due to the charge separation effect in the solvent. The trend of these potentials is the same as that of the gas phase—$B_{12}(SCN)_{12}^{2-}$ and its derivatives show excellent oxidative stability compared to the benchmark materials.

Since ethers are solvents with low polarity, it is essential to make the bonding between Mg ion and the anion in a salt less ionic to enhance its solubility. One way to evaluate the bond polarization together with the bond strength is to study the infrared (IR) vibrations. The vibrational frequency is a direct measurement of the force constant of the bond. The change of the dipole moment along a given vibrational mode is directly proportional to the intensity reflected in the IR spectrum. It is noted that any vibration involving the relative motion of the metal ion against the anion should change the dipole moment of the molecule and, therefore, should be IR active. The modes with the metal ion vibrating against a static anion are the least-energetic ones among the modes with measurable IR intensities, given the high symmetry of the ground states of the studied anions and their rigid skeleton as discussed previously.

In FIG. 9 we compare the frequency as well as the intensities of these IR modes in $MgB_{12}H_{12}$, $Mg(CB_{11}H_{12})_2$, $MgB_{12}(CN)_{12}$ and $MgB_{12}(SCN)_{12}$. In each case, we give the longitudinal mode of Mg ion vibrating against the anion. From $MgB_{12}H_{12}$ to $MgB_{12}(SCN)_{12}$, the mode frequency decreases, suggesting weaker bond strength. Compared to $MgB_{12}H_{12}$, $Mg(CB_{11}H_{12})_2$ already shows significantly lower bond strength (see FIGS. 9a and 9b) between Mg ion and the anion. The IR mode of $MgB_{12}(SCN)_{12}$ shows much lower intensity than the other three salts in FIG. 9c, indicating low polarity of the bond, while $MgB_{12}(CN)_{12}$ shows higher intensity (FIG. 9d) and therefore higher bond polarity due to the concentration of negative charge on N. This trend is consistent with the atomic charge states obtained by the NBO analysis, where Mg ion has the smallest charge of +1.51e bonded to three S atoms with −0.20e in $MgB_{12}(SCN)_{12}$ (FIG. 9c), while, in $MgB1_2(CN)_{12}$, Mg with charge +1.81e is bonded to three N atoms, each carrying −0.59e (FIG. 9d). It is worth mentioning that for the anions $CB_{11}H_{12}^-$, $CB_{11}(CN)_{12}^{2-}$, and $CB_{11}(SCN)_{12}^-$, the ground states of their salts do not show the metal ion attached to carbon. Instead, the metal ion resides as far from the carbon atom as possible.

In the presence of solvent, IR intensities increase due to the enhancement of the polarized vibration of $Mg^{2+}$ against the dianion. The bond strength is greatly weakened in each case. Interestingly, the very IR mode relevant to the dissociation of $Mg^{2+}$ with $B_{12}(SCN)_{12}^{2-}$ becomes unstable in the solvent, as indicated by its imaginary frequency. This suggests that $MgB_{12}(SCN)_{12}$ would readily dissolve in THF. The trends of the results are consistent with the calculated dissociation energy of $Ma^{2+}$-dianion in the solvent, as given in Table 9.

In conclusion, we show that SCN, which is used for detoxification of CN and for moisture-resistance of the perovskite solar cells, can also be used to produce a new family of anions for electrolyte salts. Compared to $B_{12}(CN)_{12}^{2-}$, $B_{12}(SCN)_{12}^{2-}$ displays improved properties, while maintaining high stability. Because of the unusual stability and its much weaker interaction with the metal ions compared to those of the benchmark negative ions $CB_{11}H_{12}^-$, $B_{12}(SCN)_{12}^{2-}$ and its derivatives $CB_{11}(SCN)_{13}^-$ are ideal weakly-coordinating anions which can have numerous applications in batteries, catalysis, electrochemistry, ionic liquids and photoacid generators [26]. These anions can also be applied to a new generation of batteries, such as the Li-air and Li—S batteries.

REFERENCES FOR EXAMPLE 2

[1] J. B. Goodenough and K-S. Park, J. Am. Chem. Soc. 2013, 135, 1167.
[2] R. Younesi, G. M. Veith, P. Johansson, K. Edstrom and T. Vegge, Energy Environ. Sci. 2015, 8, 1905.
[3] T. J. Carter, R. Mohtadi, T. S. Arthur, F. Mizuno, R. Zhang, S. Shirai, J. W. Kampf, Angew. Chem.2014, 126, 3237.
[4] O. Tutusaus, R. Mohtadi, T. S. Arthur, F. Mizuno, E. G. Nelson, Y. V. Sevryugina, Angew. Chem. Int. Ed.2015, 54,7900.
[5] J. Muldoon, C. B. Bucur, A. G. Oliver, T. Sugimoto, M. Matsui, H. S. Kim, G. D. Allred, J. Zajicek, Y. Kotani, Energy Environ. Sci.2012, 5, 5941.
[6] R. Mohtadi, F. Mizuno, Beilsteini Nanotechnol.2014, 5, 1291.
[7] S. Giri, S. Behera, P. Jena, Angew. Chem. Int. Ed.2014, 53, 13916.
[8] O. Borodin, W. Behl and T. R. Jow, J. Phys. Chem. C 2013, 117, 8661.
[9] O. Borodin, M. Olguin, C. E. Spear, K. W. Leiter and J. Knap, Nanotechnology 2015, 26, 354003.
[10] A. Unemoto, M. Matsuo, S. Orimo, Adv. Funct. Mater.2014, 24, 2267.
[11] W. S. Tang, A. Unemoto, W. Zhou, V. Stavila, M. Matsuo, H. Wu, S. Orimo, T. J. Udovic, Energy Environ. Sci.2015, 8, 3637.
[12] H. Zhao, J. Zhou and P. Jena, Angew. Chem. Int. Ed. 2016, 55, 1.
[13] M. Chaudhary, R. Gupta, Current Biotechnology 2012, 1, 327. R. Y. Thakur and Y. B. patil, South Asian Journal of Management Research 2009, 1, 2.
[14] Q. Jiang, D. Rebollar, J. Gong, E. L. Piacentino, C. Zheng, T. Xu, Angew. Chem. Int. Ed. 2015, 54, 7617.
[15] G. L. Gutsev, A. I. Boldyrev, Chem. Phys. Lett. 1981, 56, 277.
[16] K. Wade, J. Chem. Soc. D,1971, 792.
[17] K. Wade, Adv. Inorg. Chem. Radiochem.1976, 18, 1.
[18] D. M. P. Mingos, Acc. Chem. Res. 1984, 17, 311.
[19] D. M. P. Mingos, R. L. Johnston, Struct. Bonding (Berlin)1987,68, 29.
[20] H. Fang, P. Jena, J. Mater. Chem. A 2016, 4, 4728.
[21] H. Fang, P. Jena, J. Phys. Chem. Lett. 2016, 7, 1596.
[22] J. H. Noh, S. H. Im, J. H. Heo, T. N. Mandal and S. I. Seok, Nano Lett. 2013, 13, 1764.
[23] C. Buda, A. B. Kazi, A. Dinescu, T. R. Cundari, J. Chem. Inf. Model.2005, 45, 965.
[24] J. Warneke, T. Dificks, C. Knapp, D. Gabel, Phys. Chem. Chem. Phys. 2011, 13, 5712.
[25] R. T. Boere, S. Kacprzak, M. keßler, C. Knapp, R. Riebau, S. Riedel, T. L. Roemmele, M. Rühle, H. Scherer, S. Weber, Angew. Chem. Int. Ed. 2011, 50, 549.
[26] I. Krossing, I. Raabe, Angew. Chem. Int. Ed. 2004, 43, 2066.
[27] S. Trasatti, Pure Appl. Chem. 1986, 58, 955.
[28] V. Petr, Electrochemical Series, Handbook of chemistry and physics $92^{nd}$ Edition, 2011.
[29] M. J. Frisch, Gaussian03, revision B. 03; Gaussian, Inc.: Wallingford, Conn., 2003.
[30] A. Becke, J. Chem. Phys.1993, 98, 5648.
[31] C. Lee, W. Yang, R. G. Parr, Phys. Rev. B 1988, 37, 78.

[32] G. Kresse, J. Furthmueller, J. Comput. Mater. Sci. 1996, 6, 15.
[33] G. Kresse, J. Furthmueller, Phys. Rev. B 1996, 54, 11169.

Example 3

Superhalogen-Based Li-Ion Superionic Conductors

Abstract: Development of cheap, durable, and safe inorganic solid electrolytes with superionic conductivity is the key for the next generation of rechargeable metal-ion batteries. Recent discovery of antiperovskites with composition $Li_3OA$ (A=halogen) shows promise in this regard. Here, we demonstrate the potential of a new class of antiperovskites where halogens are replaced by $BH_4$ superhalogens. In addition to maintaining the high ionic conductivity of $Li_3OA$, $Li_3O(BH_4)$ is lightweight, mechanically flexible, thermodynamically more stable, and electronically more insulating than $Li_3OA$. By mixing $BH_4$ with Cl, we further show that conductivity of $Li_3O(BH_4)_{0.5}Cl_{0.5}$ can be increased to $10^{-3}$ S/cm at room temperature. The conduction mechanism of the material is revealed by identifying the relationship between the orientational symmetry of the $BH_4^-$ rotors and the potential surface felt by the lithium ion.

Introduction: Li-ion superionic conductors solids whose $Li^+$-ion conductivity is comparable to that in a liquid electrolyte—are critical for the development of next generation powerful, long-lasting, flexible and safe all-solid-state batteries. We demonstrate the potential of such a superionic conductor by using a superhalogen $BH_4$ to replace halogens in a $Li_3OA$ (A=halogen) antiperovskite structure. The newly designed $Li_3O(BH_4)$ and $Li_3O(BH_4)_{0.5}Cl_{0.5}$ are lightweight superionic conductors with large band gap, high melting point and desirable mechanical properties. The superionic conductivity of the material relies on the relationship between the orientational symmetry of the $BH_4^-$ rotors and the potential surface felt by the lithium ion.

Lithium-Ion batteries (LIBs) play an important role in our lives—from portable electronic devices to electric vehicles and airplanes. As we gradually move from gasoline-powered cars to electric vehicles, development of safe, efficient, and cost-effective batteries becomes essential. Current LIBs suffer from stagnant capacity (~150 mAh/g), limited recycling life (<1000 cycles) as well as durability and safety issues, much of which are attributed to the current use of liquid electrolytes. Thus, considerable efforts are being expended to develop inorganic solid electrolytes so that the next generation batteries are more powerful than those currently used. These batteries would exhibit higher energy density, better cycle performance, superior safety, greater processing characteristics, flexibility, superionic conductivity, large electrochemical stability window (ESW), good electrode compatibility, and desirable mechanical properties.

Current solid electrolytes such as LISICON (Lithium Super Ionic Conductor e.g. $Li_{14}ZnGe_4O_{16}$) [2], NASICON (Na Super Ionic Conductor e.g. $Li_{1.3}Al_{0.3}Ti_{1.7}(PO_4)$) [3], perovskite (e.g. $La_{0.5}Li_{0.5}TiO_3$) [4], garnet (e.g. $Li_7La_3Zr_2O_{12}$) [5] and LiPON (Lithium Phosphorus OxyNitride e.g. $Li_{2.88}PO_{3.73}N_{0.14}$) [6] exhibit $Li^+$-ion conductivity at room temperature of the order of $10^{-4}$ to $10^{-3}$ S/cm and activation energy in the range of 0.3-0.6 eV. The most recently discovered sulfide-based compounds, such as $Li_7P_3S_{11}$ and $Li_{10}GeP_2S_{12}$, achieve record high conductivities of the order of $10^{-2}$ S/cm and low activation energy <0.25 eV [7]. However, complex synthesis procedure, incompatibility against lithium metal, large resistance at grain boundary and high manufacturing cost restrict their commercial use [8-10].

Recently, a family of low cost Li-rich antiperovskite (LiRAP) conductors $Li_3OA$ (A=halogen) has shown great promise for solid state electrolytes. In addition to high ionic conductivity at room temperature in the order of $10^{-4}$-$10^{-3}$ S/cm up to a stellar value of 0.025 S/cm and low activation energy in the range of 0.2-0.3 eV [11-14], the above conductors show large ESW, low electronic conductivity [12-13] and excellent electrochemical stability against lithium metal anode [15]. The ionic conductivity of LiRAPs can also be significantly enhanced both by doping standard stoichiometric $Li_3OA$ (A=halogen), with divalent cations [14-15] (e.g. $Li_{3-2x}Ba_xClO$) and/or by mixing different halogens (e.g. $Li_{3-2x}Ba_xCl_{0.5}I_{0.5}O$). For example, ionic conductivity of $Li_3OCl$ can be significantly improved from $0.85\times10^3$ S/cm to $1.94\times10^{-3}$ S/cm in $Li_3OCl_{0.5}Br_{0.5}$ at room temperature [12]. Besides, recently Braga et al. successfully synthesized LiRAP-based glasses that have the highest reported conductivity among known lithium solid ionic conductors at room temperature, e.g. $Li_{3-2x}Ba_xOCl$ (x=0.005, $25\times10^{-3}$ S/cm at 25° C., $38\times10^{-3}$ S/cm at 75° C., $240\times10^{-3}$ S/cm at 100° C.), $Li_{3-2x}Ba_xOCl_{0.5}I_{0.5}$=0.005, $121\times10^{-3}$ S/cm at 50° C.) [14]. These studies clearly suggest that the halogen composition plays an important role in tuning the LiRAP's conductivity. Unfortunately, the periodic table limits the number of available halogens.

In this Example, we note that there exists a class of molecules called superhalogens which can be used to replace halogens, thus avoiding the limitation mentioned above. Superhalogens not only mimic the chemistry of halogens but also possess electron affinities that far exceed those of halogens. By focusing on one such species, namely, $BH_4$, we show that the above strategy enables us to rationally design an entirely new family of LiRAPs. More importantly, we show that the new superhalogen-based antiperovskites have properties superior to those of $Li_3OA$ (A=halogen). For example, $Li_3O(BH_4)$ and $(Li_3O)(BH_4)_{0.5}Cl_{0.5}$, in addition to exhibiting the same superionic conductivity as $Li_3OA$ (A=halogen) and its mixed phase, possess larger ESW and better thermodynamic stability as well as favorable mechanical properties. Moreover, we find that the conduction mechanism of the $BH_4$-based LiRAPs relies on the variation of the orientational symmetry of $BH_4^-$ tetrahedron in a cubic field.

We note that $Li_3O^+$ and $BH_4^-$ which are the building blocks of $Li_3O(BH_4)$ are well-known superalkalis and superhalogens, respectively. The ionization potential (IP) of $Li_3O$ is smaller than that of Li and the vertical detachment energy of $BH_4^-$ ion is higher than that of $Cl^-$. Thus, one can regard $Li_3O(BH_4)$ as a supersalt. An isolated $Li_3O^+$ has a planer configuration. However, due to the lone pair on the oxygen, when $Li_3O^+$ ion interacts with others, the three Li atoms in $Li_3O^+$ are attracted by the counterion, while the oxygen atom is repelled. Such interactions lead to a pyramidal configuration of $Li_3O^+$ as found in the crystal structure in FIG. 10a. On the other hand, $BH_4^-$ maintains its gas phase tetrahedral configuration in the crystal. The antiperovskite supersalt $(Li_3O)^+(BH_4)^-$ can also be viewed as super alkali halide (e.g. CsCl), where the alkali and halogen ions are replaced by the corresponding super-ions. This analogy was exploited in a recent study by Fang and Jena [16-17] in the design of a new class of organic-inorganic hybrid perovskites $AMX_3$ (A=organic cation; M=Ge, Sn, Pb; X=superhalogen) for solar cells. The authors found the organic cations $A^+$ to be superalkalis and $[MX_3]^-$ to be superhalogens. Furthermore, $BH_4^-$ has very similar ionic radius as that of $Br^-$. We note that $BH_4^-$ has been recently used to replace halogens and more than 30 new hydride-based perovskites [18] have been experimentally synthesized. In addition, a new series of two dimensional hybrid perovskites $BA_2MI_{4-x}(BH_4)_x$ ($BA=C_4H_9NH_3$; M=Ge, Sn, Pb; x=0-4) have been designed for optoelectronic and photoluminescent applications [19].

Method:

Geometry Optimization. Density Functional Theory (DFT) calculations are carried out to optimize the unit cell of $Li_3O(BH_4)$ using Perdew-Burke-Ernzerh (PBZ) generalized gradient approximation (GGA) for exchange-correlation functional [27] implemented in the VASP package [28]. The projector augmented wave (PAW) [29] pseudopotential method and a 16×16×16 Monkhorst-Pack k-point mesh is employed in the calculation. The cutoff energy is 550 eV. The energy convergence is set to $10^{-6}$ eV and the force convergence is set to 0.005 eV/Å. It is found that, with or without the van der Waals interaction (as implemented in the DFT+D2 method [30-31]), the optimized lattice parameters of $Li_3O(BH_4)$ and $Li_3OBr$ are very similar.

Lattice Dynamics. The phonon dispersion relations of $Li_3O(BH_4)$ are calculated using the Density Functional Perturbation Theory (DFPT). Geometry of the unit cell is optimized with an energy convergence of $10^{-8}$ eV and force convergence of $10^{-4}$ eV/Å. Phonon frequencies are first calculated on a q-grid of 5×5×5. Frequencies for other q points are then interpolated from the calculated points.

Defects and $Li^+$ ion Migration Barrier. Different defect configurations are constructed in a 3×3×3 supercell. A 2×2×2 k-grid is adopted for total energy calculation to ensure the convergence within 0.1 meV/atom in comparison with the results using denser grids. The binding energy for a pair of defects is defined as [20], $$E_{binding} = \Sigma E_{isolated-defect} - E_{cluster} \quad (m1)$$

where $E_{binding}$, $E_{isolated-defect}$ and $E_{cluster}$ are the binding energy, the formation energy of an individual defect and the formation energy of a defect pair, respectively. The $Li^+$-ion migration barriers are calculated using the climbing image nudged elastic band method [32].

Thermodynamics and Super-ionic Conductivity. Ab initio molecular dynamics (AIMD) simulations are conducted using a 4×4×4 supercell and 1.0 fs time step. NpT ensemble is used to study the thermodynamics of the material at 400 and 600 K. To study the $Li^+$-ion transport, AIMD simulations with NVT ensemble are carried out at 750, 1000, 1250 and 1500 K to speed up the ion hopping process [12]. At 2000 K, $H^+$ fast-ion conductivity, as shown in FIG. S3 in SI, is also observed. At each temperature, the AIMD lasts over 80 ps after a 40 ps pre-equilibrium run to make the linear fitting to the averaged mean square displacement (MSD) of $Li^+$-ion converge. The diffusion coefficient (D) at each temperature is calculated by fitting to the MSD according to $$D = \lim_{t \to \infty} \left[ \frac{1}{6t} \langle [\vec{r}(t)]^2 \rangle \right] \quad (m2)$$

with $\vec{r}(t)$ the displacement of $Li^+$ at time t. The conductivity ($\sigma$) is then calculated from the Nernst-Einstein relation $$\sigma = D \frac{Ne^2}{kT} \quad (m3)$$

with N being the number of ion pairs per $cm^3$. Other symbols have their customary meaning. The activation energy $E_a$ is obtained by using the Arrhenius model $$\sigma = \frac{A}{T} \exp\left(\frac{E_a}{kT}\right), \quad (m4)$$

where A is the fitting parameter.

Rotational Speed of $BH_4^-$. To estimate the rotational speed of $BH_4^-$ units, each tetrahedral unit is approximated as a rigid body and the Rodriguez displacement equations are employed, $$P_1 - P_0 = \tan\left(\frac{\phi}{2}\right)\vec{\omega} \times \left(P_1 + P_0 - 2\vec{\rho}\right) + d\vec{\omega} \quad (m5)$$

$$Q_1 - Q_0 = \tan\left(\frac{\phi}{2}\right)\vec{\omega} \times \left(Q_1 + Q_0 - 2\vec{\rho}\right) + d\vec{\omega} \quad (m6)$$

$$R_1 - R_0 = \tan\left(\frac{\phi}{2}\right)\vec{\omega} \times \left(R_1 + R_0 - 2\vec{\rho}\right) + d\vec{\omega} \quad (m7)$$

where $P_0$, $Q_0$ and $R_0$ are the positions of H atoms in $BH_4^-$ before displacement and $P_1$, $Q_1$ and $R_1$ are the positions after the displacement. $\phi$ is the angle of rotation about the rotation axis. $\vec{\omega}$ is the unit vector parallel to the rotation axis. $\vec{\rho}$ is a vector to a point of the rotation axis. d is the translation along the rotation axis. Combing the Eq.(m5), (m6) and (m7), one can obtain $$\tan\left(\frac{\phi}{2}\right)\vec{\omega} = \frac{[(Q_1 - Q_0) - (R_1 - R_0)] \times [(P_1 - P_0) - (R_1 - R_0)]}{[(Q_1 - Q_0) - (R_1 - R_0)] \cdot [(P_1 + P_0) - (R_1 + R_0)]} \quad (m8)$$

By using the velocity of H atoms ($\vec{v}_1$) at each time step (dt≈1.0 fs) from the AIMD, Eq.(m4) can be written as $$\frac{1}{2}\frac{d\phi}{dt}\vec{\omega} = \frac{(\vec{v}_1 - \vec{v}_2) \times (\vec{v}_3 - \vec{v}_2)}{(\vec{v}_1 - \vec{v}_2) \cdot [(\vec{v}_3 - \vec{v}_2)dt + 2(P_0 - R_0)]}, \quad (m9)$$

where $$\frac{d\phi}{dt}$$

is the rotation speed of each $BH_4^-$ rotor. The translational speed of the $BH_4^-$ rotor can be calculated as $$v^{\square} = \frac{1}{3}\sum_{i=1}^{3}\vec{\omega} \cdot \vec{v}_i. \quad (m10)$$

Elastic Constants. Instead of using the strain-stress method [31] and the equation of state [33-34] to calculate the elastic tensors and the modulus, we take advantage of the cubic symmetry of $Li_3O(BH_4)$ and calculate the elastic tensors of the material by using the following relations [35]. The subscripts of co denote the directions of motion of the atoms.

| $k = [\xi, 0, 0]$ | $k = [\xi, \xi, 0]$ | $k = [\xi, \xi, \xi]$ |
|---|---|---|
| $\rho\omega_{[100]}^2 = c_{11}\xi^2$ | $\rho\omega_{[110]}^2 = (c_{11} + c_{12} + 2c_{44})\xi^2$ | $\rho\omega_{[111]}^2 = (c_{11} + 2c_{12} + 4c_{44})\xi^2$ |
| $\rho\omega_{[010]}^2 = c_{44}\xi^2$ | $\rho\omega_{[1\bar{1}0]}^2 = (c_{11} - c_{12})\xi^2$ | $\rho\omega_{[1\bar{1}0]}^2 = (c_{11} - c_{12} + c_{44})\xi^2$ |
| $\rho\omega_{[001]}^2 = c_{44}\xi^2$ | $\rho\omega_{[001]}^2 = 2c_{44}\xi^2$ | $\rho\omega_{[11\bar{2}]}^2 = (c_{11} - c_{12} + c_{44})\xi^2$ |

The Young's modulus (E), shear modulus (μ) and the Poisson's ratio (ν) are then calculated as $$E = \frac{c_{11}^2 + c_{12}c_{11} - 2c_{12}^2}{c_{11} + c_{12}} \quad (m11)$$

$$\mu = c_{44} \quad (m12)$$

$$\nu = \frac{c_{12}}{c_{11} + c_{12}}. \quad (m13)$$

Results:
Crystal Structure and Stability of $Li_3O(BH_4)$

Given the similar ionic radius of $BH_4^-$ compared to that of $Br^-$ [16-17], we expected that $Li_3O(BH_4)$ could be stabilized in the same cubic phase as $Li_3OBr$, where $BH_4$ would occupy the Br sites. However, unlike Br atom, $BH_4$ cluster has tetrahedral symmetry. Thus, one also has to determine the precise orientation of the $BH_4$ tetrahedron. After an extensive testing for different starting orientations, it is found that $BH_4^-$ adopts a $C_{3v}$ orientational symmetry in the ground state. The optimized structure is given in FIG. 10(a) with a=b=c=3.996 Å and α=β=γ=90.0°. The Bader charge analysis suggests that the $BH_4$ unit possesses typical superhalogen characteristics—depriving the Li atom of electrons and the $BH_4$ cluster bears a negative charge.

The dynamic stability of $Li_3O(BH_4)$ lattice is confirmed by calculating the phonon dispersion relations. The results are given in FIG. 10b. The dispersion-less bands above 20 THz (~5 meV) are due to the rotational modes of the $BH_4^-$ unit. The optic modes above 40 THz (~10 meV) also involve the distortions of $BH_4^-$. The rotations of $BH_4^-$ are coupled with the translational vibrations of Li atoms.

The thermal stability of $Li_3O(BH_4)$ is tested by carrying out molecular dynamics (MD) simulation at constant temperature and pressure. The radial distribution function of O—O, Li—O and O—B calculated from the MD trajectory data at 400 K and 600 K are shown in FIG. 10c. No melting of the crystal is observed, indicating that the melting point of $Li_3O(BH_4)$ should be higher than that of $Li_3OA$ (A=halogen) [12]. The linear thermal expansion coefficient estimated from the MD data is $2.9\times10^{-5}$/K which is similar to those of $Li_3OA$ ($2.1\times10^{-5}$/K and $1.8\times10^{-5}$/K for A=Cl and Br, respectively [12]). The calculated electronic density of states using the HSE functional is given in FIG. 10d. It shows a large band gap of 7 eV which is higher than those (around 5 eV) of $Li_3OA$ (A=halogen). The valence and conduction bands are contributed by O and Li just as seen in $Li_3OA$ (A=halogen). These results suggest that $Li_3O(BH_4)$ should have a larger ESW.

Diffusion Mechanism

To investigate the superionic conductivity of $Li_3O(BH_4)$, we note that defects are usually one of the important prerequisites for fast-ion motion in solid electrolytes. We have studied the effect of three possible defects which include a Schottky pair involving $Li^+$ and $BH_4^-$ vacancies ($V_L$-$V_{BH4}$), a Schottky pair involving $2Li^+$ and $O^{2-}$ vacancies ($V_{2Li}$-$V_O$) and a Frankel defect consisting of interstitial Li with a substitutional O on the site of $BH_4$ (Li.—$O'_{BH4}$). The formation energy and the binding energy that measure the strength of attractive interaction between paired defects [20] are summarized in Table 5. Although a migration path with extremely low energy barrier of about 0.04 eV is identified for the defect of Li.—$O'_{BH4}$, the binding energy of the defect is relatively high, indicating that the motion of the interstitial Li will be localized by the substitutional oxygen. Also, such defect is unlikely to appear due to its high formation energy (twice as much) compared to the defects with $Li^+$ vacancies. On the other hand, the $V_{Li}$-$V_{BH4}$ defect has the lowest binding energy and formation energy and should be the major contributor to the fast Li ion conductivity inside the material.

TABLE 5

Properties of the studied defects. All energies are in eV. See the Method section for the calculation process of these energies.

|  | Formation Energy | Binding Energy |
|---|---|---|
| $V_{Li}$—$V_{BH4}$ | 1.17 | 0.10 |
| $V_{2Li}$—$V_O$ | 1.21 | 0.90 |
| Li.—$O'_{BH4}$ | 2.06 | 0.73 |

Figure 11A:
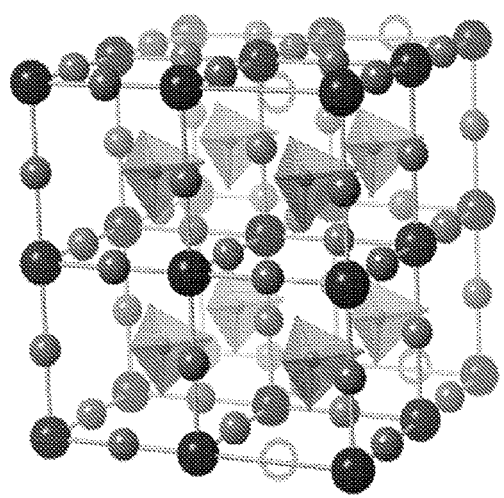
FIG. 11A-C. (a) The 2×2×2 supercell of $Li_3O(BH_4)$ used in the molecular dynamics (MD) simulation. The yellow circles indicate the sites of Li$^+$ vacancies. (b) The calculated mean square displacement (MSD) of Li$^+$ ion at 750, 1000, 1250 and 1500 K. The bottom curve is the MSD from a MD simulation at 1500 K with fixed $BH_4^-$. (c) Fitting to the diffusion coefficients at different temperatures using the Arrhenius model.
Figure 11B:
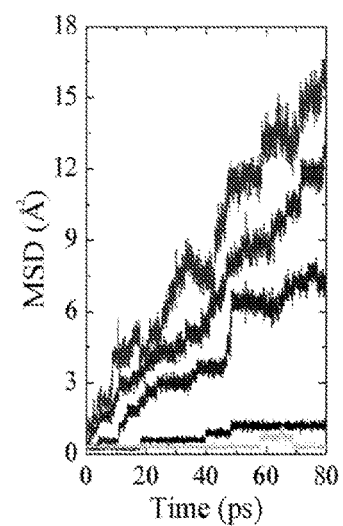
Figure 11C:
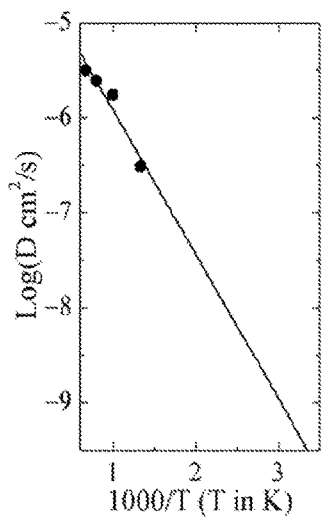

Having established that the $Li^+$ vacancy is responsible for the superionic conductivity of $Li_3O(BH_4)$, which is similar to the case of $Li_3OA$ (A=halogen) [11-12], we calculate the migration barrier of $Li^+$ hopping to the vacancy along the edge of $Li_6O$ octahedron as shown in FIG. 10a. Because of the aspherical symmetry of the $BH_4^-$ in $Li_3O(BH_4)$, there are 12, instead of 1, possible pathways for the migration of Li. The averaged energy barrier is found to be 0.344 eV which is very similar to the barrier of 0.367 eV [12] in $Li_3OCl$. We find that, with a $BH_4^-$ vacancy along the route, the migration barrier rises to much higher value, 0.493 eV, due to the positive residual charge and the local distortion around the $BH_4^-$ vacancy. Similar phenomenon has also been observed in $Li_3OA$ (A=halogen) with the halogen vacancy. The diffusion coefficient (D) at each temperature is obtained by a linear fit to the data of mean square displacement (MSD) of the lithium ion against the simulation time. Arrhenius model is then used to fit to the diffusion coefficients at different temperatures to obtain the $Li^+$ conductivity at room temperature and the activation energy. Details of the above calculations are provided in the Method section. The results of MSD and the D vs. temperature relation are shown in FIG. 11b and 11c, respectively. The activation energy is 0.301 eV, almost identical to the calculated value of 0.303 eV in $Li_3OCl$ [12] using the same theoretical method. The calculated conductivity of $Li_3O(BH_4)$ at room temperature is $0.10\times10^3$ S/cm which is very close to $0.12\times10^{-3}$ S/cm of $Li_3ClO$ with the $Li^+$ vacancy obtained using the same method. This method is known to underestimate the absolute value of the conductivity [12] as the experimental conductivity of $Li_3ClO$ is $0.85\times10^{-3}$ S/cm [11-12].

Given the low energy of the rotational modes of $BH_4^-$ as shown in the phonon dispersion in FIG. 10b, all these modes will be fully excited at room temperature (25 meV) and beyond. We find that the rotational motion of $BH_4^-$ plays the central role in the conduction mechanism of $Li_3O(BH_4)$. This is because after freezing the rotation of $BH_4^-$, the superionic conductivity of $Li^+$ disappears, as shown by the MSD in FIG. 11c.

We also find that the migration of $Li^+$ is not likely to be due to the so-called "paddle-wheel mechanism", where $BH_4^-$ 'kicks' (or attracts) the $Li^+$ ion around through its rotation [21]. In our 1500 K MD simulation lasting over 100 ps, we estimate the averaged surface speed of H atom of the rotating $BH_4^-$ unit to be about 0.2 Å/fs, while the highest speed of $Li^+$ presence is of order of $10^{-2}$ Å/fs—an order of magnitude smaller than the surface speed of $BH_4^-$. Also, the averaged velocity correlation, defined as the normalized dot product between the instant velocity of $Li^+$ and its nearest H atom, is a negative number, close to zero. Had $Li^+$ ion been 'kicked' by the H atom in $BH_4^-$, the speed of $Li^+$ ion should be of the same order as the speed of H atom and the averaged velocity correlation should be non-negligibly positive.

In our model with the $Li^+$ vacancy, the $Li^+$ ion migrates from $A_1$ site to $A_2$ site as shown in FIG. 12a. Each site is coordinated with four $BH_4^-$ units. The interaction potential created by each of the $BH_4^-$ units on the Li ion can be expressed by a multipole expansion $$\phi(\vec{r}) = \frac{1}{4\pi\varepsilon_0}\left[\frac{q}{r} + \frac{\vec{p}\cdot\vec{r}}{r^3} + \frac{1}{2}\sum_{ij}\frac{r_i r_j}{r^5}Q_{ij} + \ldots\right], \quad (1)$$

where $q=-e$ is the total charge of the $BH_4^-$ superhalogen and $\vec{r}$ the vector from boron (B) at the center of the $BH_4^-$ unit to the $Li^+$ ion. $\vec{p}$ is the dipole moment generated by the charge distribution inside the $BH_4^-$ unit, $$\vec{p} = \sum_{i=1}^{4} q_i^H \vec{R}_i^H - q\vec{r} = \sum_{i=1}^{4} q_i^H \vec{r}_i^H, \quad (2)$$

where $q_i^H = -0.25e$ is the charge on each H atom, $\vec{R}_i$ represent the coordinates of each H atom and $\vec{r}_i$ is the relative coordinate of each H atom from the boron center. $Q_{ij}$ is the quadrupole term, $$Q_{ij} = \sum_{k=1}^{4} q_k (3R_i^k R_j^k - R^2 \delta_{ij}), \quad (3)$$

where $q_k$ is the charge on each H atom and $R_i^k$ is the $i^{th}$ coordinate of the $k^{th}$ H atom. In Eq. (1), both the dipole and the quadrupole terms are determined by the orientational symmetry of the $BH_4^-$ unit inside the cubic cell.

To understand the relationship between the orientational symmetry of the $BH_4^-$ tetrahedron and the magnitude of the interaction potential in Eq. (1), we first note that there are four distinctive symmetry groups of a tetrahedron in a cubic field [22]–$T_d$, $D_{2d}$, $C_{2v}$ and $C_{3v}$, as shown schematically in FIG. 12b. The $T_d$, $D_{2d}$, $C_{2v}$ and $C_3$ groups have 2, 6, 8 and 12 symmetrically equivalent orientations, respectively. For each group, we calculate the dipole plus quadrupole terms of the in-plane interaction potential created by four $BH_4^-$ with certain orientation in the region (0.1 Å×0.1 Å square) around the Li site (e.g. region around the $A_1$ site in FIG. 10a). The results are shown in FIG. 12b for all the symmetrically equivalent orientations in each group. One can see that, due to certain orientational symmetry, the dipole and quadrupole terms will be zero, as in the case of the $T_d$ group. The orientation of $C_3$, group, which is the ground state orientation (FIG. 10a), gives the lowest potential of the order of $-4\pi\varepsilon_0 \times 10^{-3}$ e/Å$\approx 10^{-3}$ V (e is the electron charge in Coulomb). The potential difference of the $C_3$, group vs. the $T_d$, $D_{2d}$ and $C_{2v}$ groups is large enough to make a $Li^+$ ion reach a speed of the order of $10^{-2}$ Å/fs—the highest speed observed in our MD simulation, if all the potential energy is converted to the kinetic energy of one $Li^+$ ion. In each group, the symmetrically equivalent orientations would generate different dipole plus quadrupole terms and there exists some degeneracy in each case. The order of magnitude of the potential, however, is solely determined by the symmetry group. Since, upon thermal excitation, the $BH_4^-$ units are expected to be randomly oriented, the potential exerted on $Li^+$ ion in real case is generated from a combination of different orientational symmetries. Therefore, according to the above analysis, there must be a spatial variation of the potential felt by $Li^+$ ion in the material. And the maximum descent of the potential surface can reach the order of $10^{-2}$ V.

It is possible to define a set of order parameters to characterize the four symmetry groups of the $BH_4^-$ rotor [22], $$M_1 = \frac{3\sqrt{3}}{4}\sum_{i=1}^{4} x_i y_i z_i \quad (4)$$

$$M_2 = \frac{3\sqrt{5}}{40}\sum_{i=1}^{4}(5x_i^3 - 3x_i r_i^2) \quad (5)$$

$$M_3 = \frac{3\sqrt{3}}{8}\sum_{i=1}^{4} x_i(y_i^2 - z_i^2). \quad (6)$$

$(x_i, y_i, z_i)$ are the coordinates of the H atoms of the $BH_4$ rotor with origin at the central B atom. The calculated values of the order parameters for the four symmetry groups are given in Table 6.

TABLE 6

The averaged order parameters for the four symmetry groups [22].

| | $\langle M_1^2\rangle$ | $\langle M_2^2\rangle$ | $\langle M_3^2\rangle$ |
|---|---|---|---|
| $T_d$ | 1 | 0 | 0 |
| $D_{2d}$ | 0 | 0 | $\frac{1}{3}$ |
| $C_{2v}$ | 0 | $\frac{5}{16}$ | $\frac{1}{48}$ |
| $C_{3V}$ | $\frac{1}{81}$ | $\frac{80}{243}$ | 0 |

Figure 12C:
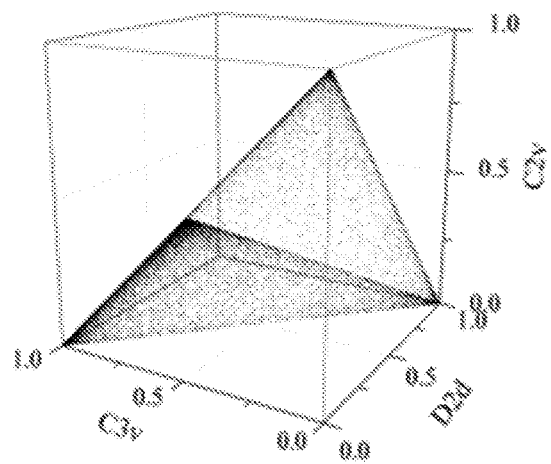
Figure 12D:
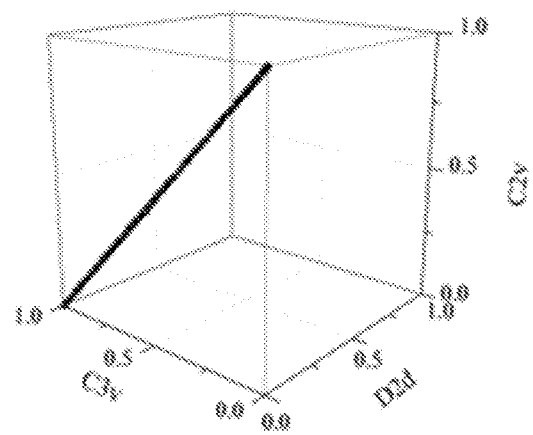
Figure 12E:
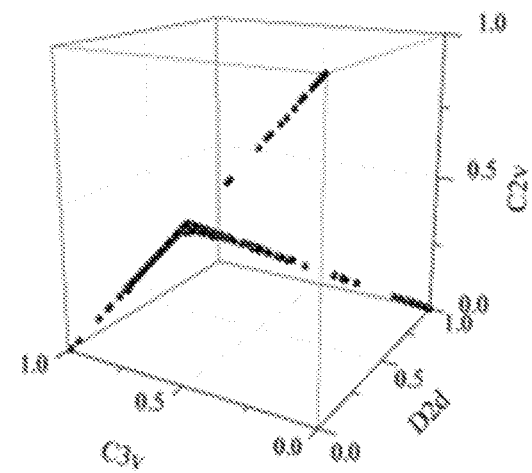
Figure 12F:
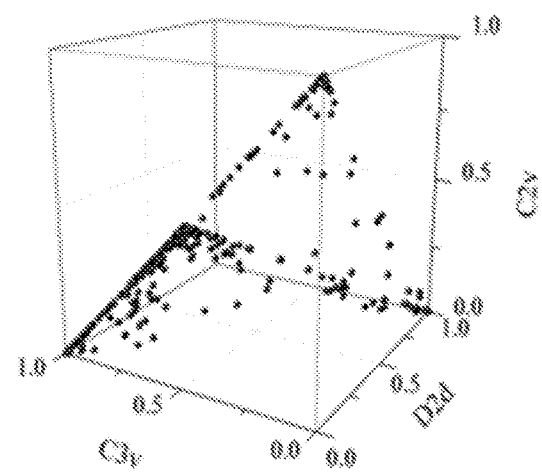

With these order parameters, we analyze the orientations of the $BH_4^-$ rotors around the highest-speed $Li^+$ ions in our MD data over 100 ps time span by decomposing each rotor's orientation into three symmetry groups $D_{2d}$, $C_{2v}$ and $C_{3v}$. We do not consider the $T_d$ group at this point, given that the group is highly symmetric and a random rotor is unlikely to adopt the symmetry. For each rotor, its three order parameters can be written as $$M_1^2 = a_3 \frac{1}{81} \quad (7)$$

$$M_2^2 = a_2 \frac{5}{16} + a_3 \frac{80}{243} \quad (8)$$

$$M_3^2 = a_1 \frac{1}{3} + a_2 \frac{1}{48}, \quad (9)$$

where $a_1^2$, $a_2^2$ and $a_3^2$ measure the partial contribution from $D_{2d}$, $C_{2v}$ and $C_{3v}$, respectively, to the total orientation of a random rotor. They satisfy the normalization condition, $a_1^2+a_2^2+a_3^2=1$. The analyzed result of the MD data is shown in FIG. 12c. There are three apparent lines in the $D_{2d}$-$C_{2v}$-$C_{3v}$ triangle. The first is along the diagonal of the $C_{3v}$—$C_{2v}$ plane, which shows the mixing of $C_{2v}$ and $C_{3v}$ symmetries of the orientation. The second line is on the diagonal plane of the plotted cubic box, which shows the mixing of the $C_{3v}$-$C_{2v}$-0.5$D_{2d}$ symmetries of the rotor orientation. The third line is along the diagonal of the $D_{2d}$-$C_{2v}$ plane, which shows the mixing of $C_{2v}$-$D_{2d}$ symmetries of the rotor orientation. To see the origin of these three featured lines, we carry out a simulation by generating four randomly oriented rotors and calculate their dipole plus quadrupole potential (Eq.2 and 3) at the Li$^+$ site. It turns out that all the data points with the minimum potential (~-0.05 V in our calculation) fall on the first line of $C_{3v}$-$C_{2v}$ mixing, as shown in FIG. 12d. The data points with the maximum potential (~+0.02 V in the calculation) all fall on the first and the second lines of the $C_{3v}$-$C_{2v}$ mixing and $C_{3v}$-$C2_{2v}$-0.5$D_{2d}$ mixing, respectively, as shown in FIG. 12e. All the data points having zero potential fall on the first, second and the third lines of the $C_{3v}$-$C_{2v}$ mixing, the $C_{3v}$-$C_{2v}$-0.5$D_{2d}$ mixing and the $D_{2d}$-$C_{2v}$ mixing, respectively, as shown in FIG. 12f. These results suggest that, since the orientations that entail the minimum, maximum and zero potential are mixing together along the featured lines, the potential created by the $BH_4^-$ rotors will have a temporal variation and can readily show large fluctuations.

According to the above discussion, the temporal variation of the potential surface caused by the change of the $BH_4^-$ orientation can constantly deliver kinetic energy to the Li$^+$ ion (like a jumping ball on a constantly shaking sheet), preparing enough energy for Li$^+$ ion to hop. The spatial variation of the potential by the orientational change of $BH_4^-$ rotors facilitate the migration of the Li$^+$ ion in long distance to the lower potential site. The $BH_4^-$ super-ions serve more like 'rotating gates' [21, 23] generating lower potential profiles along the migration pathway of the Li$^+$ ion, as shown by the schematic potential curves (1 compared to 2) from $A_1$ site to $A_2$ site in FIG. 12a.

TABLE 7

Calculated elastic constants of $Li_3O(BH_4)$. According to the cubic symmetry, there are only three distinctive elastic tensors $c_{11}$, $c_{12}$ and $c_{44}$. E is the Young's modulus. ν the Poisson's ratio and μ the shear modulus. All in the unit of GPa.

| | | | |
|---|---|---|---|
| $c_{11}$ | 116 | E | 114 |
| $c_{12}$ | 12 | ν | 0.1 |
| $c_{44}$ | 51 | μ | 51 |

Mechanical Properties

Lightweight batteries with excellent flexibility are necessary to power wearable electronics and implantable medical devices. Given the weight of $Li_3O(BH_4)$ being only about half of those of $Li_3OA$ (A=halogen), we find that the material also shows favorable mechanical properties. From the phonon spectrum (FIG. 10b), we extract the elastic tensors of $Li_3O(BH_4)$ from the acoustic branches at the three wave vectors [ξ,0,0], [ξ,ξ, 0] and [ξ,ξ,ξ] (see the Method section). Other elastic constants are further calculated from the elastic tensors as tabulated in Table 7. For the lithium solid electrolyte, there is a threshold for the shear modulus above which the dendric growth of Li anode can be inhibited. For materials with small Poisson's ratio (close to zero), the threshold is four times the shear modulus of Li metal [24], which is about 35 GPa. The shear modulus of $Li_3O(BH_4)$ (μ=51 GPa) is well above this threshold. Compared to typical ductile materials with both small Young's modulus and Poisson's ratio, $Li_3O(BH_4)$ shows a Young's modulus (E=114 GPa) between those of copper (125 GPa) and aluminum (75 GPa). Its Poisson's ratio (ν=0.1) is between that of aluminum (0.34) and the carbon fiber (0.045). These indicate that $Li_3O(BH_4)$ conductor should have good flexibility.

Compositional Mixing of $BH_4$ and Cl

Figure 13A:
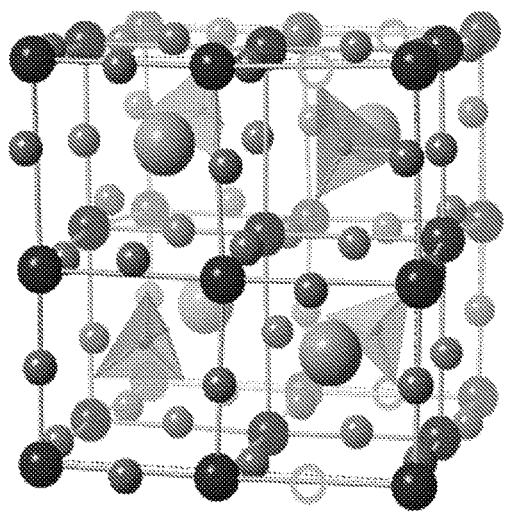
FIG. 13A-C. (a) The 2×2×2 supercell of mixed phase of $Li_3O(BH_4)_{0.5}Cl_{0.5}$ used in the molecular dynamics (MD) simulation. The yellow circles indicate the sites of Li$^+$ vacancies. (b) The calculated mean square displacement (MSD) of Li⁺ ion at 750, 1000, 1250 and 1500 K. (c) Fitting to the diffusion coefficients at different temperatures using the Arrhenius model.
Figure 13B:
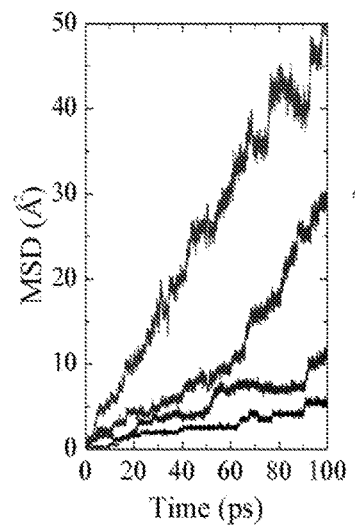
Figure 13C:
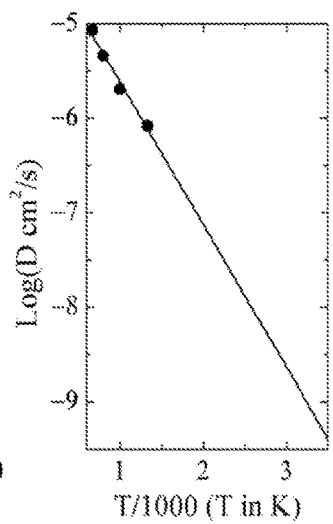

One way to improve the superionic conductivity is to make a material that is chemically and structurally more disordered. It is known that the mixed phase of $Li_3OCl_{0.5}Br_{0.5}$ has much higher Li$^+$ ion conductivity than both the $Li_3OBr$ and $Li_3OCl$ phases, reaching 1.94×10$^3$S/cm at room temperature [11-12]. We find that the mixed phase of $Li_3O(BH_4)_{0.5}Cl_{0.5}$ with a lithium vacancy, as shown by the supercell in FIG. 13a, shows significantly enhanced Li$^+$-ion conductivity. By fitting to the MSD in FIG. 13b, we calculate the diffusion coefficients at different temperatures and obtain a room-temperature conductivity of 0.21×10$^3$S/cm, as shown in FIG. 13c. This value is identical to that of $Li_3OCl_{0.5}Br_{0.5}$ with Li vacancy calculated by the same theoretical method [12]. It is noted that although such method can reproduce the correct relative ratio, i.e. 2:1 of $Li_3OCl_{0.5}Br_{0.5}$ vs $Li_3OCl$ and $Li_3O(BH_4)_{0.5}Cl_{0.5}$ vs $Li_3O(BH_4)$, it will underestimate the absolute value. Given the same theoretical conductivity of $Li_3OCl_{0.5}Br_{0.5}$ and $Li_3O(BH_4)_{0.5}Cl_{0.5}$, it is expected that $Li_3O(BH_4)_{0.5}Cl_{0.5}$ can reach a similar Li$^+$ ion conductivity over 10$^{-3}$ S/cm as $Li_3OCl_{0.5}Br_{0.5}$ does in experiment. The activation energy of $Li_3O(BH_4)_{0.5}Cl_{0.5}$ is 0.299 eV which is also similar to 0.288 eV of $Li_3OCl_{0.5}Br_{0.5}$.

Route to Experimental Synthesis

The hydride-based perovskites have already been synthesized where the halogen/oxygen atoms are replaced by $BH_4$ moieties [18]. $Li_3O(BH_4)$ can be synthesized in a similar manner as $Li_3OA$ crystals, namely by replacing halogens with $BH_4$ superhalogens. We note that the reaction of $Li_2O+$ LiA gives rise $Li_3OA$. To synthesize $Li_3O(BH_4)$, we have studied the energetics of the reaction $Li_2O+ LiA \rightarrow Li_3OA$ with that of $Li_2O+LiBH_4 \rightarrow Li_3O(BH_4)$. Both reactions are endothermic; while formation of $Li_3OA$ requires 13.9 and 25.8 meV/atom for A=Cl and Br [12], respectively, $Li_3O(BH_4)$ would require 58.8 meV/atom. We further find that the molar volume of $Li_3O(BH_4)$ is about 17% more compact than the combined molar volumes of $Li_2O$ and $LiBH_4$. However, if we start with $Li_2O$ and $LiBH_4$ as clusters, the formation of $Li_3O(BH_4)$ cluster instead of crystal becomes exothermic with about 200 meV/atom (see FIG. S6 in SI). Thus, it would be easier to synthesize $Li_3O(BH_4)$ by first ball milling $Li_2O$ and $LiBH_4$ separately and then annealing the product under high pressures. Using $Li_2O_2$ instead of $Li_2O$ may introduce lithium deficiencies in synthesized $Li_3O(BH_4)$, thus, improving its superionic conductivity.

Conclusion: We have shown that, based on the antiperovskite structure of $Li_3OA$ (A=halogen), a stable and lightweight superionic conductor $Li_3O(BH_4)$ can be created by replacing halogens "A" with superhalogen $BH_4^-$. The material exhibits Li-ion conductivity of the order of 10$^{-4}$ S/cm, an activation energy of 0.3 eV, a large ESW, high melting temperature and favorable mechanical properties. It is also shown that, in a mixed phase formed by mixing halogens and superhalogens in equal proportion, the Li$^+$-ion conductivity of $Li_3OCl_{0.5}(BH_4)_{0.5}$ at room temperature can be improved significantly to over 10$^{-3}$ S/cm. The conduction mechanism of the new superionic conductor relies on the rotations of the $BH_4^-$ units upon thermal excitation, generating different orientational symmetries of the $BH_4^-$ tetrahedra. Altering orientational symmetry of the $BH_4^-$ rotors further results in spatial and temporal variation of the potential surface felt by a $Li^+$ ion, enhancing $Li^+$-ion migration inside the material. Such mechanism can also explain the observed super-ionic conduction in the recently reported lithium and sodium salts that contain $BH_4^-$ as well as large cage-like anions $B_{12}H_{12}$ and $CB_{11}H_{12}$[25].

This study adds to the power of the superhalogen $BH_4^-$ in the rational design of yet another energy material—the solid electrolytes in Li-ion batteries. We note that $BH_4^-$ has been used to make metal salts for hydrogen storage [26], to replace halogens to synthesize new perovskite crystals [18], to design new inorganic-organic hybrid perovskites for solar cells [16-17] and to create new two-dimensional hybrid perovskites for LED applications [19]. With $BH_4^-$, new physical and chemical degrees of freedom have been introduced into the super-ionic conductor family of $Li_3OA$ (A=halogen). Combined with other improvements in stability and mechanical properties discussed above, $Li_3O(BH_4)_xA_x$ antiperovskites are ideal solid electrolytes. The current study could also be applied to antiperovskites containing sodium, such as $Na_3OA$ (A=$BH_4$, $NO_3$ and CN) [21], given that $Na_3O^+$, like $Li_3O^+$, is a superalkali and both $NO_3^-$ and $CN^-$ are superhalogens.

REFERENCES FOR EXAMPLE 3

1. Y. Wang, W. D. Richards, S. P. Ong, L. J. Miara, J. C. Kim, Y. Mo, G. Ceder, Design Principles for Solid-state Lithium Superionic Conductors, Nature Materials 2015, 14, 1026-1031.
2. P. G. Bruce, The A-C conductivity of polycrystalline LISICON, $Li_{2+2x}Zn_{1-n}GeO_4$, and a model for intergranular constriction resistances, J. Electrochem. Soc 1983, 130, 662-669.
3. H. Aono, Ionic conductivity of solid electrolytes based on lithium titanium phosphate, J. Electrochem. Soc 1990, 137, 1023-1027.
4. Y. Inaguma, et al, High ionic conductivity in lithium lanthanum titanate, Solid State Commun 1993, 86, 689-693.
5. R. Murugan, V. Thangadurai, W. Weppner, Fast lithium ion conduction in garnet-type $Li_7La_3Zr_2O_{12}$, Angew. Chem. Int. Ed 2007, 46, 7778-7781.
6. X. Yu, J. B. Bates, G. E. Jellison, F. X. Hart, A stable thin-film lithium electrolyte: Lithium phosphorus oxynitride, J. Electrochem. Soc 1997, 144, 524-532.
7. A. Kuhn, V. Duppel, B. V. Lotsch, Tetragonal $Li_{10}GeP_2S_{12}$ and $Li_7GePS_8$-exploring the Li ion dynamics in LGPS Li electrolytes, Energy Environ. Sci 2013, 6, 3548-3552.
8. N. Kamaya, K. Homma, Y. Yamakawa, M. Hirayama, R. Kanno, M. Yonemura, T. Kamiyama, Y. Kato, S. Hama, K. Kawamoto and A. mitsui, Nat. Mater. 2011, 10, 682.
9. J. B. Goodenough, H. Y. P. Hong and J. A. Kafalas, Mater. Res. Bull. 1976, 11, 203.
10. R. Murugan, V. Thangadurai and W. Weppner, Angew. Chem. Int. Ed. 2007, 46, 7778.
11. Y. Zhao and L. L. Daemen, Superionic Conductivity in Lithium-rich Anti-perovskites, J. Am. Chem. Soc. 2012, 134, 15042-15047.
12. Y. Zhang, Y. Zhao, C. Chen, Ab initio study of the stabilities of and mechanism of superionic transport in lithium-rich antiperovskites, Phys. Rev. B 2013, 87, 134303.
13. A. Emly, E. Kioupakis, A. Van der Ven, Phase stability and transport mechanisms in antiperovskite $Li_3OCl$ and $Li_3OBr$ superionic conductors, Chemistry of Materials 2013, 25, 4663-4670.
14. M. H. Braga, J. A. Ferreira, V. Stockhausen, J. E. Oliveira, A. El-Azab, Novel $Li_3ClO$ based glasses with superionic properties for lithium batteries, J. Mater. Chem. A 2014, 2, 5470-5480.
15. X. J. Lu, G. Wu, J. W. Howard, A. P. Chen, Y. S. Zhao, L. L. Daemen, Q. X. Jia, Chem. Commun 2014, 50, 11520.
16. H. Fang, P. Jena, Super-ion inspired colorful hybrid perovskite solar cells, J. Mater. Chem. A 2016, 4, 4728-4737.
17. H. Fang, P. Jena, Molecular origin of properties of organic-inorganic hybrid perovskites: the big picture from small clusters, J. Phys. Chem. Lett 2016, 7, 1596-1603.
18. P. Schouwink, M. B. Ley, A. Tissot, H. Hagemann, T. R. Jensen, L. Smrcok, R. Cerny, Structure and properties of complex hydride perovskite materials, Nat. Commun 2014, 5, 5706.
19. Q. Yao, H. Fang, K. Deng, E. Kan, P. Jena, Superhalogens as building blocks of two-dimensional organic-inorganic hybrid perovskites for optoelectronics applications, Nanoscale 2016, 8, 17836-17842.
20. Z. Lu, C. Chen, Z. M. Baiyee, X. Chen, C. Niu and F. Ciucci, Defect Chemistry and Lithium Transport in $Li_3OCl$ Anti-perovskite superionic Conductors, Phys. Chem. Chem. Phys. 2015, 17, 32547-32555.
21. M. Jansen, Volume Effect or Paddle-Wheel Mechanism≥Fast Alkali-metal Ionic Conduction in solids with Rotationally Disordered Complex Anions, Angew. Chem. Int. Ed. 1991, 30, 1547-1558.
22. M. L. Klein, I. R. McDonald and Y. Ozaki, Orientational Order in Ionic Crystals Containing Tetrahedral Ions, J. Chem. Phys. 1983, 79, 5579-5587.
23. R. Frech, Spectroscopic Studies of a Superionic Plastic Phase Crystal: Lithium Sulfate, Mat. Res. Soc. Symp. Proc., 1989, 135, 219-225.
24. C. Monroe and J. Newman, The Impact of Elastic Deformation on Deposition Kinetics at Lithium/Polymer Interfaces, J. Electro. Soc. 2005, 152, A396-A404.
25. W. S. Tang, A. Unemoto, W. Zhou, V. Stavila, M. Matsuo, H. Wu, S. Orimo and T. J. Udovic, Unparalleled Lithium and Sodium Superionic Conduction in Solid Electrolytes with Large Monovalent Cage-like Anions, Energy Environ. Sci. 2015, 8, 3637-3645.
26. A. Zuttel, S. Rentsch, P. Fischer, P. Wenger, P. Sudan, Ph. Mauron, Ch. Emmenegger, Hydrogen Storage Properties of $LiBH_4$, Journal of Alloys and Compounds 2003, 356-357, 515-520.
27. J. P. Pewdew, K. Burke, M. Ernzerhof, Phys. Rev. Lett. 1996, 77, 3865.
28. Kresse, G.; Furthmueller, J. Efficiency of Ab-initio Total Energy Calculations for Metals and Semiconductors Using a Plane-wave Basis Set, J. Comput. Mater. Sci. 1996, 6, 15-50.
29. Kresse, G.; Furthmueller, J. Efficient Iterative Schemes for Ab Initio Total-energy Calculations Using a Plane-wave Basis Set, Phys. Rev. B 1996, 54, 11169-11186.
30. S. Grimme, J. Comput. Chem. 2006, 27, 1787.

31. H. Fang, M. Dove and K. Refson, Ag-Ag Dispersive Interaction and Physical Properties of $Ag_3Co(CN)_6$, Phys. Rev. B, 2014, 90, 054302.
32. http://theory.cm.utexas.edu.vtsttools/neb.
33. H. Fang, B. Liu, M. Gu, X. Liu, S. Huang, C. Ni, Z. Li and R. Wang, High-pressure Lattice Dynamic and Thermodynamic Properties of Ir by First Principle Calculation, Physica. B. 2010, 405, 732-737.
34. H. Fang, M. Gu, B. Liu, X. Liu, S. Huang, C. Ni Z. Li and R. Wang, Plane-wave Pseudopotential Study for the Structural Stability of Hf: The Role of Spin-orbit Interaction, Physica B, 2011, 406, 1744-1748.
35. M. Dove, Introduction to Lattice Dynamics, Cambridge University Press, 1993.

While the invention has been described in terms of its several exemplary embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

I claim:

1. A battery comprising an electrolyte within a battery housing, wherein negative ions of said electrolyte have the formula $R_zB_xA_x$, wherein z is 0 or 1 and if z is 1 then R is a C atom, x and y range from 1-12, and A is CN or SCN, with the caveat that if A is CN, then y ranges from 5-12.

2. The battery of claim 1, wherein said battery is a Li ion battery, a Na ion battery or a Mg ion battery.

3. The battery of claim 1, wherein said electrolyte is selected from the group consisting of $LiCB_{11}(CN)_{12}$, $Li_2CB_{11}(CN)_{12}$, $Li_2B_{12}(CN)_{12}$, $MgB_{12}(CN)_{12}$, $MgCB_{11}(CN)_{12}$, $[LiB_{12}(SCN)_{12}]^-$, $Li_2B_{12}(SCN)_{12}$, $LiCB_{11}(SCN)_{12}$ and $MgB_{12}(SCN)_{12}$.

4. The battery of claim 1, further comprising a carrier, wherein said electrolyte is dissolved or dispersed in the carrier and wherein said carrier is selected from the group consisting of ethylene carbonate, dimethyl carbonate, allyl methyl sulfone; diethyl carbonate; diethyl sulfite; ethylene sulfite; ethyl methyl carbonate; fluoroethylene carbonate 99%; 3-(methylsulfonyl)-1-propyne; propylene carbonate; 1,2-propyleneglycol sulfite; propylene sulfate; 1,3-propylene sulfite; vinylene carbonate; trans-2,3-butylene carbonate;

{2-[2-(2-methoxyethoxy)ethoxy]ethoxy} trimethylsilane;
bis {2-[2-(2-methoxyethoxy)ethoxy]ethoxy}dimethylsilane;
{3-[2-(2-(2-methoxyethoxy)ethoxy)ethoxy]-propyl} trimethylsilane; and
{[2-(2-(2-methoxyethoxy)ethoxy)ethoxy]-methyl} trimethylsilane.

5. The battery of claim 1, wherein A is 12.

6. A rechargeable device or vehicle comprising at least one battery according to claim 1.

7. The rechargeable device of claim 6, wherein said rechargeable device is a cell phone, a word processing device, a media storage device, a car, or a tool.

8. A solution comprising
 i) an electrolyte wherein negative ions of said electrolyte have the formula $R_zB_xA_x$, wherein z is 0 or 1 and if z is 1 then R is a C atom, x and y range from 1-12, and A is CN or SCN, with the caveat that if A is CN, then y ranges from 5-12, and
 ii) a carrier.

9. The solution of claim 8, wherein A is 12.

10. A battery comprising an electrolyte within a battery housing, wherein the electrolyte is selected from the group consisting of $LiCB_{11}(CN)_{12}$, $Li_2CB_{11}(CN)_{12}$, $Li_2B_{12}(CN)_{12}$, $MgB_{12}(CN)_{12}$, $MgCB_{11}(CN)_{12}$, $[LiB_{12}(SCN)_{12}]^-$, $Li_2B_{12}(SCN)_{12}$, $LiCB_{11}(SCN)_{12}$ and $MgB_{12}(SCN)_{12}$.

11. A solution comprising
 i) an electrolyte selected from the group consisting of $LiCB_{11}(CN)_{12}$, $Li_2CB_{11}(CN)_{12}$, $Li_2B_{12}(CN)_{12}$, $MgB_{12}(CN)_{12}$, $MgCB_{11}(CN)_{12}$, $[LiB_{12}(SCN)_{12}]^-$, $Li_2B_{12}(SCN)_{12}$, $LiCB_{11}(SCN)_{12}$ and $MgB_{12}(SCN)_{12}$, and
 ii) a carrier.

* * * * *